United States Patent
Mituyasu et al.

(10) Patent No.: US 9,137,859 B2
(45) Date of Patent: Sep. 15, 2015

(54) LED MODULE AND ILLUMINATION DEVICE HAVING A SENSOR SUITABLE FOR DOWNSIZING

(71) Applicant: Panasonic Corporation, Osaka (JP)

(72) Inventors: Kei Mituyasu, Osaka (JP); Katunobu Hamamoto, Osaka (JP); Koji Saeki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 217 days.

(21) Appl. No.: 13/933,301

(22) Filed: Jul. 2, 2013

(65) Prior Publication Data

US 2014/0015421 A1 Jan. 16, 2014

(30) Foreign Application Priority Data

Jul. 11, 2012 (JP) ................. 2012-155167

(51) Int. Cl.
*H05B 33/08* (2006.01)
*H05B 37/02* (2006.01)

(52) U.S. Cl.
CPC ............ *H05B 33/08* (2013.01); *H05B 33/0806* (2013.01); *H05B 33/0854* (2013.01); *H05B 33/0869* (2013.01); *H05B 37/0227* (2013.01)

(58) Field of Classification Search
CPC .............. H05B 33/08; H05B 33/0803; H05B 33/0824; H05B 33/0827; H05B 33/0842; H05B 37/0227; H05B 33/0854; H05B 33/0806; H05B 33/0884; H05B 33/0869
See application file for complete search history.

(56) References Cited

U.S. PATENT DOCUMENTS

| 2012/0098465 | A1* | 4/2012 | Rothschild | 315/360 |
| 2012/0169240 | A1* | 7/2012 | Macfarlane | 315/152 |
| 2013/0221859 | A1* | 8/2013 | Pavelchak | 315/159 |
| 2013/0307424 | A1* | 11/2013 | Gray et al. | 315/193 |
| 2014/0097757 | A1* | 4/2014 | Maa et al. | 315/152 |

FOREIGN PATENT DOCUMENTS

| JP | 2008-278640 A | 11/2008 |
| JP | 2008278640 | * 11/2008 |
| JP | 2010-287403 A | 12/2010 |

* cited by examiner

*Primary Examiner* — Jung Kim
(74) *Attorney, Agent, or Firm* — Renner, Otto, Boisselle & Sklar, LLP

(57) ABSTRACT

An LED module includes a light-emitting unit composed of a plurality of LEDs connected in series to one another, a sensor unit, a power interrupt circuit inserted into a power supply path through which the light-emitting unit is supplied with power from an external power source, and a control circuit that controls the power interrupt circuit according to output of the sensor unit. The LED module further includes a secondary battery and a voltage supply circuit. The voltage supply circuit supplies the control circuit with voltage equivalent to voltage drop between the ends of a group of LEDs included in the plurality of LEDs that constitute the light-emitting unit while the external power source is supplying power to the light-emitting unit, and supplies the control circuit with voltage output from the secondary battery while power interrupt circuit is interrupting the power from the external power source to the light-emitting unit.

7 Claims, 10 Drawing Sheets

FIG. 8

| Sensor output voltage | Tr1 | Tr3 | Tr4 | Light-emitting unit (dimming rate) |
|---|---|---|---|---|
| 0.5 V or less | OFF | OFF | OFF | Turned off |
| 0.5 V~2.0 V | ON | OFF | OFF | 100% |
| 2.0 V~3.5 V | ON | OFF | ON | 70% |
| 3.5 V~5.0 V | ON | ON | OFF | 40% |

LED MODULE AND ILLUMINATION DEVICE HAVING A SENSOR SUITABLE FOR DOWNSIZING

TECHNICAL FIELD

The present invention relates to LED modules and illumination devices, and in particular to an LED module and an illumination device that can turn on and off LEDs according to output of a sensor.

BACKGROUND ART

Conventionally, there has been proposed an illumination device that turns on a light emitting diode (LED) when detecting a person with the use of a motion sensor.

For example, in an illumination device described in Patent Literature 1, a microcomputer unit (hereinafter, referred to "control circuit") performs control to turn on and off a light-emitting unit composed of a plurality of LEDs connected in series to one another according to the output voltage of a motion sensor.

Such an illumination device requires to supply power to the control circuit, in addition to the LED, so as to drive them. Here, voltage required to drive the control circuit (hereinafter, such voltage is referred to as "driving voltage") is lower than the voltage supplied from an external power source to turn on the light-emitting unit, and the illumination device described in Patent Literature 1 therefore reduces the voltage from the external power source with the use of a dedicated voltage-down circuit and supplies the control circuit with the reduced voltage.

CITATION LIST

Patent Literature

[Patent Literature 1]
 Japanese Patent Application Publication No. 2010-287403
[Patent Literature 2]
 Japanese Patent Application Publication No. 2008-278640

SUMMARY OF INVENTION

Technical Problem

The illumination device that can turn on and off the LED according to output of the sensor as described above has been desired to be downsized. However, if the illumination device includes a dedicated voltage-down circuit to supply the control circuit with a driving voltage, the size of the device will be large. Thus, the dedicated voltage-down circuit hinders downsizing of the illumination device.

Meanwhile, as disclosed in Patent Literature 2, there has been proposed a power source device that divides voltage between the ends of a series of LEDs included in a plurality of LEDs in the light-emitting unit, and uses a fraction of the voltage as a driving voltage of a control circuit. Such a power source device does not need a dedicated voltage-down circuit that supplies the control circuit with a driving voltage, and accordingly the power source device can be downsized.

It therefore could be possible to downsize the illumination device by applying a technology disclosed in Patent Literature 2 to the illumination device disclosed in Patent Literature 1, which can turn on and off the LED according to output of the sensor, so as to supply the control circuit with voltage equivalent to voltage drop between the ends of a series of LEDs included in the plurality of LEDs in the light-emitting unit.

However, with this structure, once the current flowing through the LEDs is interrupted to turn off the LEDs according to output of the sensor, power supplied to the control circuit is also interrupted and the control circuit stops. This makes the LEDs unable to be turned on again according to output of the sensor.

The present invention has been achieved in view of the above problem, and an aim thereof is to provide a downsized LED module and illumination device that can maintain the function of turning on and off the LEDs according to output of the sensor.

Solution to Problem

In order to solve the above problem, an LED module pertaining to one aspect of the present invention comprises a light-emitting unit, a sensor unit, a power interrupt circuit, a control circuit and a voltage supply circuit. The light-emitting unit includes a plurality of LEDs connected in series to one another. The power interrupt circuit is inserted in a power supply path through which the light-emitting unit is supplied with power from an external power source. The control circuit controls the power interrupt circuit to adjust an amount of power to be output to the light-emitting circuit according to output of the sensor unit. The voltage supply circuit supplies the control circuit with voltage equivalent to voltage drop between the ends of a group of LEDs included in the plurality of LEDs while the light-emitting unit is being supplied with power from the external power source, and supplies the control circuit with voltage output from an internal power source while the power interrupt circuit is interrupting the power supplied from the external power source to the light-emitting unit.

In the LED module according to the above aspect, the following may be possible.

The LED module further comprises a charging circuit. The internal power source is a secondary battery. The charging circuit charges, while the light-emitting unit is being supplied with power from the external power source, the secondary battery with voltage supplied from the voltage supply circuit.

When the control circuit detects that the voltage output from the internal power source falls to or below a reference voltage while the power interrupt circuit is interrupting the power supplied from the external power source to the light-emitting unit, the control circuit controls the power interrupt circuit such that power supply from the external power source to the light-emitting unit resumes regardless of the output of the sensor unit.

The voltage supply circuit includes: a first diode connected in a forward direction of the first diode between a high-potential end of the group of the LEDs and the control circuit; and a second diode connected in a forward direction of the second diode between the internal power source and the control circuit.

The sensor unit serves as at least one of a motion sensor, a brightness sensor and a signal receiver.

It is possible to constitute an illumination device comprising: the LED module according to the above aspect; and a lighting device that supplies power to the LED module.

An illumination device pertaining to another aspect of the present invention is an illumination device comprising: an LED module including a light-emitting unit including a plurality of LEDs connected in series to one another, a sensor unit, a control circuit that outputs a control voltage for controlling power supplied to the light-emitting unit according to output of the sensor unit, and an output unit that outputs the control voltage from the control circuit to outside; and a lighting device including a first power source, a power interrupt circuit inserted in a power supply path through which the light-emitting unit is supplied with power from the first power source, and a power supply control circuit that controls the power interrupt circuit to adjust an amount of power to be output to the light-emitting unit based on the control voltage from the output unit, wherein the LED module further includes: a second power source; and a voltage supply circuit that supplies the control circuit with voltage equivalent to voltage drop between the ends of a group of LEDs included in the plurality of LEDs while the first power source is supplying the power to the light-emitting unit, and supplies the control circuit with voltage output from the second power source while the power interrupt circuit is interrupting the power from the first power source to the light-emitting unit.

Advantageous Effects of Invention

In the LED module according to the above aspect, the voltage supply circuit supplies the control circuit with voltage equivalent to voltage drop between the ends of the group of LEDs included in the plurality of LEDs in the light-emitting unit while the light-emitting unit is being supplied with power from the external power source. It is therefore possible to supply the control circuit with voltage lower than the output voltage of the external power source.

Further, since no dedicated voltage-down circuit is required for reducing the voltage supplied from the external power source down to the driving voltage of the control circuit, the size of the circuit can be small and the LED module can be downsized.

Furthermore, while a power supply from the external power source to the light-emitting unit is being interrupted, the voltage supply circuit supplies the control circuit with the output voltage of the internal power source. With this structure, even when the power from the external power source to the light-emitting unit is interrupted, voltage is continued to be supplied to the control circuit.

Accordingly, even while the power supply from the external power source to the light-emitting unit is being interrupted, the control circuit can control the power interrupt circuit according to output of the sensor unit and resume the power supply from the external power source to the light-emitting unit. That is, the control circuit can maintain the function of turning on and off the LEDs according to output of the sensor unit.

An illumination device according to the latter aspect achieves the same advantageous effects as above.

BRIEF DESCRIPTION OF DRAWINGS

FIG. 8 shows a table of the relationship between a voltage that is input to a sensor input terminal of the control circuit and an on-state/off-state of a transistor, regarding the LED module pertaining to Embodiment 2.

DESCRIPTION OF EMBODIMENTS

<Embodiment 1>
<1> Circuit Structure

Figure 1:
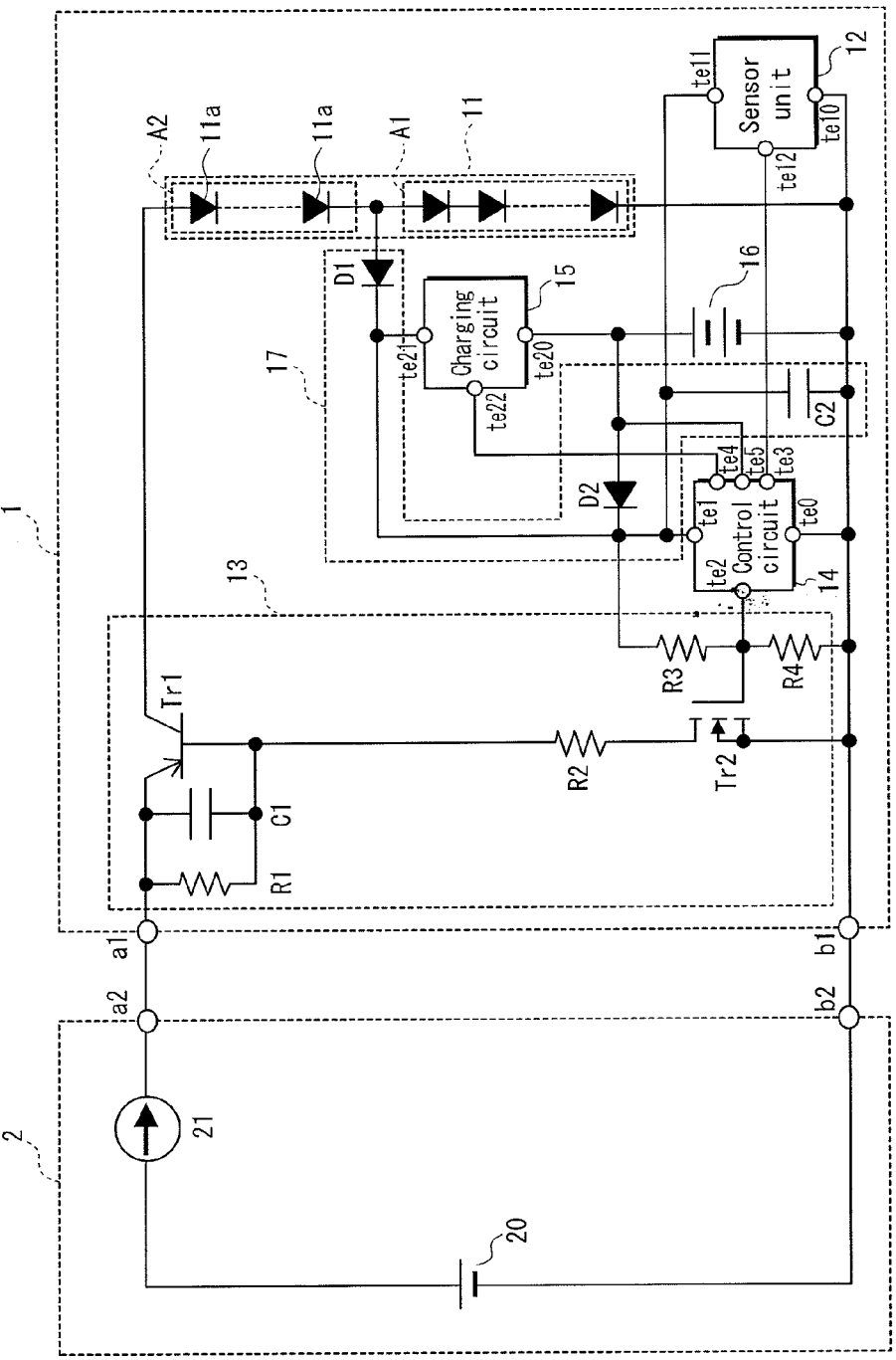
FIG. 1 is a circuit diagram of an illumination device pertaining to Embodiment 1.

FIG. 1 is a circuit diagram of an illumination device pertaining to Embodiment 1.

The illumination device includes an LED module 1 and a lighting device 2 that supplies power to the LED module 1.

<1-1> Lighting Device

The lighting device 2 includes a DC power source (external power source) 20 and a constant current source 21 connected to a high-potential output terminal of the DC power source 20. The lighting device 2 further includes a positive terminal a2 and a negative terminal b2. The positive terminal a2 is connected to a positive terminal a1 of the LED module 1. The negative terminal b2 is connected to a negative terminal b1 of the LED module 1.

<DC Power Source>

The DC power source 20 is, for example, composed of a rectifier circuit and a capacitor. The rectifier circuit is composed of a diode bridge connected to a commercial power source, etc. The capacitor is for smoothing a pulsating power, and is connected between output terminals of the rectifier circuit. A high-potential edge of the capacitor is connected to the positive terminal a2 via the constant current source 21, and the low-potential output terminal of the capacitor is connected to the negative terminal b2.

The DC power source 20 may further include a power factor correction (PFC) circuit for correcting power factor inserted between the constant current source 21 and a set of the rectifier circuit and the smoothing capacitor. Further, the DC power source 20 may be a primary battery, for example.

<Constant Current Source>

The constant current source 21 is inserted between the high-potential output terminal of the DC power source 20 and the positive terminal a2. The constant current source 21 controls the current flowing from the DC power source 20 to the positive terminal a2 to be approximately constant. The constant current source 21 may include a switching element, a current detection resistor, and a control circuit, for example. If this is the case, the switching element and the current detection resistor are inserted between the high-potential output terminal of the DC power source 20 and the positive terminal a2, and the control circuit turns on and off the switching element according to the voltage between both terminals of the current detection resistor. The switching element can be composed of a transistor, etc.

<1-2> LED Module

As shown in FIG. 1, the LED module 1 includes a light-emitting unit 11, a sensor unit 12, a power interrupt circuit 13, a control circuit 14, a charging circuit 15, a secondary battery 16, and a voltage supply circuit 17. The LED module 1 also includes the positive terminal a1 for receiving power supplied from the lighting device 2 and the negative terminal b1.

<Light-Emitting Unit>

The light-emitting unit 11 is composed of a series circuit in which a plurality of LEDs 11a are connected in series to one another. The plurality of LEDs 11a constituting the light-emitting unit 11 are classified into a group A1 (hereinafter, referred to as "first group") that is at the low-potential edge and a group A2 (hereinafter, referred to as "second group") that is at the high-potential edge.

It is preferable that the LEDs 11a constituting the light-emitting unit 11 have the same or similar electrical properties and optical properties so as not to cause irregular light emission of the LED module 1. The number of the LEDs 11a constituting the light-emitting unit 11 is not limited as long as the voltage between the ends of the light-emitting unit 11 is not greater than an output voltage of the DC power source 20.

<Sensor Unit>

The sensor unit 12 serves as a so-called motion sensor that detects whether a person exists in a space that can be illuminated with the light-emitting unit 11 (hereinafter, this space is referred to as "lighting space").

The sensor unit 12 includes an infrared sensor, an amplifier circuit, a differentiating circuit, and a binary level voltage output circuit, for example. The infrared sensor uses a pyroelectric element. The amplifier circuit amplifies output of the infrared sensor. The differentiating circuit detects a change in output of the amplifier circuit. The binary level voltage output circuit converts the absolute value of output of the differentiating circuit into a binary level voltage and outputs the converted voltage. The sensor unit 12 determines whether a person exists in the lighting space by detecting motion of the person. The sensor unit 12 further includes a ground terminal te10, a power supply terminal te11, and an output terminal te12. The ground terminal te10 is connected to the negative terminal b1, and the power supply terminal te11 is connected to the voltage supply circuit 17. Here, the amplifier circuit, the differentiating circuit and the binary level voltage output circuit that constitute part of the sensor unit 12 are driven with the voltage supplied from the power supply terminal te11.

The sensor unit 12 outputs voltage at different levels according to whether detecting a person or not. For example, when detecting a person, the sensor unit 12 outputs the first level voltage from the output terminal te12, and when not detecting a person, the sensor unit 12 outputs the second level voltage that is lower than the first level voltage, from the output terminal te12. For example, the first level voltage is set between 3.5 V and 5.0 V, and the second level voltage is set to approximately 0 V.

Note that the infrared sensor is not limited to a thermal type infrared sensor using a pyroelectric element, and may be a quantum type infrared sensor using a photodiode and a phototransistor, etc. The sensor unit 12 is not limited to a unit using an infrared sensor, and may be a unit using a Doppler sensor that utilizes a visible light sensor and a microwave, for example.

<Power Interrupt Circuit>

The power interrupt circuit 13 is inserted into a power supply path through which the lighting device 2 supplies power to the light-emitting unit 11. In the on-state, the power interrupt circuit 13 supplies power from the lighting device 2 to the light-emitting unit 11, and in the off-state, the power interrupt circuit 13 interrupts the power supply.

The power interrupt circuit 13 includes transistors Tr1 and Tr2, a capacitor C1, and resistors R1, R2, R3 and R4. The transistor Tr1 is composed of a PNP-type bipolar transistor, and connected between the positive terminal a1 and the high-potential input terminal of the light-emitting unit 11. The transistor Tr2 is composed of an N-channel type MOSFET, and its source is connected to the negative terminal b1 and its gate is connected to the first output terminal te2 of the control circuit 14. When the transistor Tr2 is switched on, the base voltage of the transistor Tr1 becomes approximately the same as voltage of the negative terminal b1, the base current flows through the transistor Tr1, and the transistor Tr1 is switched on. On the other hand, when the transistor Tr2 is switched off, the emitter voltage of the transistor Tr1 becomes approximately the same as the base voltage of the transistor Tr1, the base current flowing through the transistor Tr1 is interrupted, and the transistor Tr1 is switched off. The capacitor C1 and the resistor R1 are connected in parallel to each other between the emitter and the base of the transistor Tr1. The capacitor C1 and the resistor R1 serve as a snubber circuit that absorbs a surge voltage occurring when the transistor Tr is switched on and off.

Note that the transistor Tr1 may be composed of an NPN-type bipolar transistor. In this case, the transistor Tr2 should be a P-channel type MOSFET. The transistor Tr1 may be composed of an FET, and the transistor Tr2 may be composed of a bipolar transistor.

<Secondary Battery>

The secondary battery (internal power source) 16 has a cathode connected to the charging circuit 15 and the voltage supply circuit 17, and an anode connected to the negative terminal b1. The secondary battery 16 is composed of a small-sized large capacity battery such as a lithium-ion battery. The range of an output voltage of the secondary battery 16 (hereinafter, referred to as "reference voltage range") is set beforehand based on the driving voltage of the control circuit 14 and the sensor unit 12, for example. For example, when the driving voltage of the control circuit 14 and the sensor unit 12 is 12 V, the reference voltage range should be set not smaller than 13 V and not greater than 15 V.

As the secondary battery 16, a lead storage battery, a lithium-ion polymer battery, a nickel-hydrogen storage battery, a nickel-cadmium storage battery, a nickel-iron storage battery, a nickel-zinc storage battery, and a silver oxide-zinc storage battery, etc., may be used.

<Charging Circuit>

The charging circuit 15 is inserted between the voltage supply circuit 17 and the secondary battery 16. The charging circuit 15 supplies the secondary battery 16 with current from the voltage supply circuit 17, and interrupts the current supply to the secondary battery 16.

Figure 2:
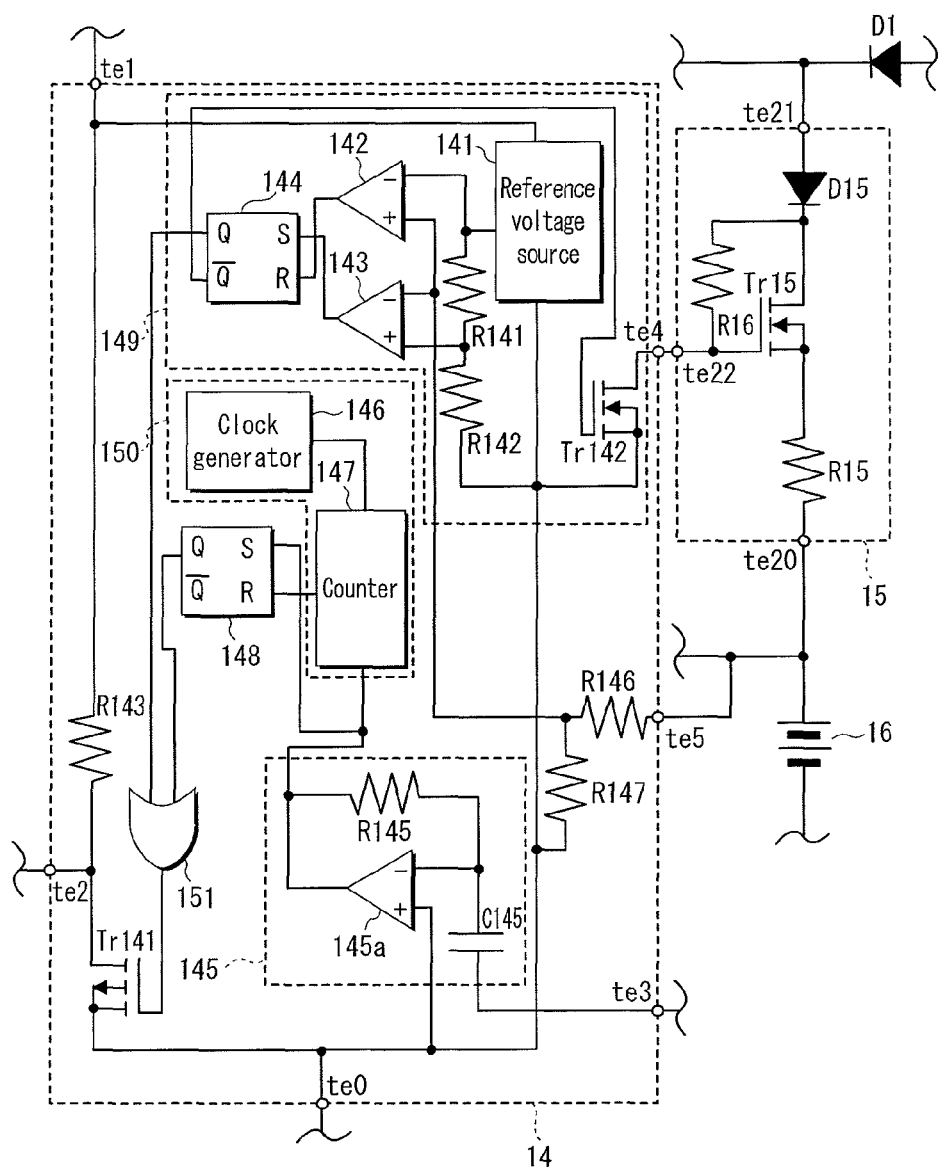
FIG. 2 is a circuit diagram of a control circuit and a charging circuit pertaining to Embodiment 1.

As shown in FIG. 2, the charging circuit 15 is composed of one IC package, and includes a diode D15, a transistor Tr15, resistors R15 and R16, and the first, second and third terminals te20, te21 and te22. The diode D15 has an anode connected to the voltage supply circuit 17, and a cathode connected to the transistor Tr15. The transistor Tr15 has a source connected to the cathode of the secondary battery 16 via the resistor R15, a gate connected to the second output terminal te4 of the control circuit 14, and a drain connected to the cathode of the diode D15. When the transistor Tr15 is switched on, the voltage supply circuit 17 supplies current to the secondary battery 16. On the other hand, when the transistor Tr15 is switched off, the current supply to the secondary battery 16 is interrupted. The transistor Tr15 is composed of an N-channel type MOSFET. Here, the resistor R15 is a current limiting resistor that prevents overcurrent in the secondary battery 16 during charging of the secondary battery 16. The resistor R16 is connected between the gate and the drain of the transistor Tr15. The resistor R16 is a so-called pull-up resistor, and pulls the gate of the transistor Tr15 up to a potential that is approximately the same as a potential of the cathode of the diode D15 when a transistor Tr142 of a control circuit 142 described later is off. As a result of this, it is possible to pull up the potential of the gate of the transistor Tr15 to a potential of the source of the transistor Tr15, i.e., to a potential that is higher than a potential of the high-potential edge of the secondary battery 16 by a turn-on voltage of the transistor Tr15, and switch the transistor Tr15 on.

Note that the charging circuit 15 is not limited to be composed of one IC package, and may be formed by combining discrete parts.

<Control Circuit>

As shown in the circuit diagram of FIG. 1, the control circuit 14 switches on and off the transistor Tr2 of the power interrupt circuit 13 and the transistor Tr15 of the charging circuit 15 according to voltage input from the sensor unit 12 or the output voltage of the secondary battery 16. The details on the internal structure of the control circuit 14 are provided below.

The control circuit 14 includes a ground terminal te0, a power supply terminal te1, the first output terminal te2, a sensor input terminal te3, the second output terminal te4, and a detection terminal te5. The ground terminal te0 is connected to the negative terminal b1. The power supply terminal te1 is connected to the voltage supply circuit 17. The first output terminal te2 is connected to a gate of the transistor Tr2 that constitutes part of the power interrupt circuit 13. The sensor input terminal te3 is connected to the output terminal te12 of the sensor unit 12. The second output terminal te4 is connected to the charging circuit 15. The detection terminal te5 is connected to the cathode of the secondary battery 16. Here, voltage occurring between the ground terminal te0 and the sensor input terminal te3 is equivalent to voltage input from the sensor unit 12, and voltage occurring between the ground terminal te0 and the detection terminal te5 is equivalent to the output voltage of the secondary battery 16.

When the sensor unit 12 detects a person and the first level voltage is input to the sensor input terminal te3, the control circuit 14 outputs "high" level voltage from the first output terminal te2 and switches the transistor Tr2 on. This causes the lighting device 2 to supply power to the light-emitting unit 11. On the other hand, when the sensor unit 12 does not detect a person and the second level voltage lower than the first level voltage is input to the sensor input terminal te3, the control circuit 14 outputs "low" level voltage from the first output terminal te2 and switches the transistor Tr2 off. This interrupts a power supply from the lighting device 2 to the light-emitting unit 11. In the following description, "high" level voltage is equivalent to a predetermined voltage greater than 0 V, and "low" level voltage is equivalent to approximately 0 V.

Further, the control circuit 14 detects the output voltage of the secondary battery 16 with the use of the detection terminal te5. When the output voltage of the secondary battery 16 is lower than the lower limit of the predetermined reference voltage range, the control circuit 14 outputs "high" level voltage from the second output terminal te4 to switch the transistor Tr15 of the charging circuit 15 on. This causes the charging circuit 15 to supply current to the secondary battery 16. On the other hand, when the output voltage of the secondary battery 16 is greater than the upper limit of the reference voltage range, the control circuit 14 outputs "low" level voltage from the second output terminal te4 to switch the transistor Tr15 off. This interrupts a power supply from the charging circuit 15 to the secondary battery 16.

<Voltage Supply Circuit>

The voltage supply circuit 17 includes diodes D1 and D2 and a capacitor C2. The diode D1 has an anode connected to the light-emitting unit 11, and a cathode connected to the power supply terminal te1 of the control circuit 14. Here, the anode of the diode D1 is connected between one of the LEDs 11a that is at the highest potential edge among a plurality of LEDs 11a belonging to the first group A1 and one of the LEDs 11a that is at the lowest potential edge among a plurality of LEDs 11a belonging to the second group A2, in the light-emitting unit 11. The diode D2 has an anode connected to the anode of the secondary battery 16, and a cathode connected to the power supply terminal te11 of the control circuit 14. The capacitor C2 is connected between the negative terminal b1 and the cathodes of the diodes D1 and D2.

The number of LEDs 11a constituting the first group A1 is set so that when power is supplied from the lighting device 2 to the light-emitting unit 11, voltage between the ends of a series of LEDs 11a constituting the first group A1 among the plurality of LEDs 11a is to some extent greater than the driving voltage of the control circuit 14 and the sensor unit 12. For example, when the driving voltage of the control circuit 14 and the sensor unit 12 is 12 V and voltage of one of the LEDs 11a in a forward direction thereof is 3.5 V, if the number of LEDs 11a belonging to the first group A1 is 5, the voltage of 17.5 V, which is greater than the driving voltage by 5.5 V, can be supplied to the control circuit 14 and the sensor unit 12.

The cathodes of the diodes D1 and D2 are each connected to the power supply terminal te1 of the control circuit 14, the power supply terminal te11 of the sensor unit 12, and the charging circuit 15. When the diode D1 is switched on and the diode D2 is switched off while the transistor Tr1 of the power interrupt circuit 13 is on, the control circuit 14, the sensor unit 12 and the charging circuit 15 are supplied with voltage equivalent to voltage drop between the ends of a series of LEDs 11a (plurality of LEDs 11a belonging to the first group A1) included in the plurality of LEDs 11a in the light-emitting unit 11. On the other hand, when the diode D1 and the diode D2 are switched on while the transistor Tr1 of the power interrupt circuit 13 is off, the control circuit 14 and the sensor unit 12 are supplied with voltage output from the secondary battery 16. A time period during which the transistor Tr1 is off is equivalent to a time period during which power from the lighting device 2 to the light-emitting unit 11 is being interrupted. A time period during which the transistor Tr1 is on is equivalent to a time period during which power is being supplied from the lighting device 2 to the light-emitting unit 11.

<1-3> Control Circuit

The following describes the structure of the control circuit 14 in detail.

FIG. 2 is a circuit diagram of the control circuit 14 and the charging circuit 15 pertaining to the present embodiment.

The control circuit 14 is composed of one IC package. The control circuit 14 includes a voltage detection circuit 149, a timer circuit 150, a differentiating circuit 145, an RS flip-flop circuit 148, an OR circuit 151, a transistor Tr141, a pull-up resistor R143, and resistors R146 and R147. Note that components of the control circuit 14 described later may be composed of separate IC packages, and the control circuit 14 may be formed by assembling the IC packages.

Here, each of the differentiating circuit 145, the timer circuit 150 and the RS flip-flop circuit 148 in the control circuit 14 can be considered as one component. With this structure, during the first period that starts when the sensor unit 12 detects a person and that ends when a predetermined time period (e.g., one minute) elapses since the sensor unit 12 stops detecting the person, the RS flip-flop circuit 148 outputs "high" level voltage. Further, with this structure, during a period other than the above first period, "low" level voltage is output.

In the voltage detection circuit 149, during the second period that starts when the output voltage of the secondary battery 16 becomes lower than the lower limit of the reference voltage range and that ends when the output voltage of the secondary battery 16 becomes greater than the upper limit of the reference voltage range, an RS flip-flop circuit 144 outputs "high" level voltage. Further, during a period other than the above second period, the voltage detection circuit 149 outputs "low" level voltage.

The OR circuit 151 inputs, to the gate of the transistor Tr141, the result obtained by carrying out an OR operation between the output of the RS flip-flop circuit 148 and the output of the RS flip-flop circuit 144. As a result of this, during the above first or second period, the control circuit 14 keeps the transistor Tr1 of the power interrupt circuit 13 on. During a period other than the above first or second period, the control circuit 14 keeps the transistor Tr1 of the power interrupt circuit 13 off. The following describes these processing in detail.

The differentiating circuit 145 is composed of a known differentiating circuit including an operational amplifier 145a, a resistor R145, and a capacitor C145. The differentiating circuit 145 inputs a differential voltage of voltage occurring at the sensor input terminal te3 to the timer circuit 150. The differentiating circuit 145 outputs a positive pulse voltage at the timing of a rising edge of voltage occurring at the sensor input terminal te3, and outputs a negative pulse voltage at the timing of a falling edge of voltage occurring at the sensor input terminal te3.

The timer circuit 150 includes a clock generator 146 and a counter 147. When the negative pulse voltage is input from the differentiating circuit 145, the counter 147 starts timing in synchronization with a clock signal input from the clock generator 146 (hereinafter, this is referred to as "timer circuit 150 is switched on"). A value counted by the counter 147 is incremented from "0" in synchronization with the clock signal input from the clock generator 146. Subsequently, when the value counted by the counter 147 reaches a predetermined value (e.g., value corresponding to one minute), "high" level voltage is input to a reset terminal R of the RS flip-flop circuit 148. Subsequently, after one cycle of the clock signal elapses, the counter 147 is reset (hereinafter, this is referred to as "timer circuit 150 is switched off"). Further, voltage input from the counter 147 to the reset terminal R of the RS flip-flop circuit 148 is generally maintained at "low" level.

The RS flip-flop circuit 148 has a set terminal S connected to an output terminal of the operational amplifier 145a of the differentiating circuit 145, the reset terminal R connected to the timer circuit 150, and an output terminal Q connected to one input terminal of the OR circuit 151. When a positive pulse voltage is input from the differentiating circuit 145 to the set terminal S, the RS flip-flop circuit 148 sets voltage of the output terminal Q to "high" level. On the other hand, when "high" level voltage is input from the timer circuit 150 to the reset terminal R, the RS flip-flop circuit 148 sets voltage of the output terminal Q to "low" level. This enables the RS flip-flop circuit 148 to output "high" level voltage during the above first period, and output "low" level voltage during a period other than the above first period.

The voltage detection circuit 149 includes a reference voltage source 141, comparators 142 and 143, the RS flip-flop circuit 144, resistors R141 and R142 and a transistor Tr142. The reference voltage source 141 is composed of bandgap regulator, for example, and outputs a constant reference voltage lower than voltage occurring between the power supply terminal te1 and the ground terminal te0. The resistors R141 and R142 are connected in series to each other between an output terminal of the reference voltage source 141 and the ground terminal te0, and constitute a divider circuit that divides the reference voltage. The reference voltage is equivalent to the upper limit of the reference voltage range of the secondary battery 16 (e.g., 15 V), and voltage occurring at a junction of the resistors R141 and R142 is equivalent to the lower limit of the reference voltage range of the secondary battery 16 (e.g., 13 V).

The comparator 143 inputs "high" level voltage to the set terminal S of the RS flip-flop circuit 144 when voltage input to the detection terminal te5 becomes lower than the lower limit of the reference voltage range (voltage occurring at the junction of resistors R141 and R142). When "high" level voltage is input to the set terminal S of the RS flip-flop circuit 144, voltage of the output terminal Q of the RS flip-flop circuit 144 becomes "high" level.

On the other hand, the comparator 142 inputs "high" level voltage to the reset terminal R of the RS flip-flop circuit 144 when voltage input to the detection terminal te5 becomes greater than the upper limit of the reference voltage range (reference voltage output from the reference voltage source 141). When "high" level voltage is input to the reset terminal R of the RS flip-flop circuit 144, voltage of the output terminal Q of the RS flip-flop circuit 144 becomes "low" level.

Here, a divider circuit formed by connecting the resistors R146 and R147 in series to each other is inserted between the detection terminal te5 and the ground terminal te0. Further, one of the input terminals of each of the comparators 142 and 143 is connected between the resistors R146 and R147. In this way, by providing the divider circuit, voltage of the secondary battery 16 can be detected even while the control circuit 14 is operating by using power supplied from the secondary battery 16.

With the above structure of the control circuit 14, the RS flip-flop circuit 144 outputs "high" level voltage during the above second period, and outputs "low" level voltage during a period other than the above second period.

During the above second period, in the charging circuit 15, "high" level voltage is input to the third terminal te22, the transistor Tr15 is switched on, and current is supplied to the secondary battery 16. On the other hand, during a period other than the above second period, in the charging circuit 15, "low" level voltage is input to the third terminal te22, the transistor Tr15 is switched off, and current supply to the secondary battery 16 is interrupted.

The transistor Tr142 is composed of an N-channel type MOSFET. Its source is connected to the ground terminal te0, its gate is connected to the output terminal $\overline{Q}$ of the flip-flop circuit 144, and its drain is connected to the second output terminal te4. When the transistor Tr142 is switched on, the gate potential of the transistor Tr15 of the charging circuit 15 reduces to a potential of the ground terminal Te0, and the transistor Tr15 is switched off.

The OR circuit 151 has one input terminal connected to the output terminal Q of the RS flip-flop circuit 148, and the other input terminal connected to the output terminal Q of the RS flip-flop circuit 144. The output terminal of the OR circuit 151 is connected to the gate of the transistor Tr141.

During the above first or second period, "high" level voltage is input to the OR circuit 151 from at least one of the output terminal Q of the RS flip-flop circuit 148 and the output terminal Q of the RS flip-flop circuit 144, and "high" level voltage is output to the transistor Tr141.

On the other hand, during a period other than the above first or second period, "low" level voltage is input to the OR circuit 151 from both the output terminal Q of the RS flip-flop circuit 148 and the output terminal Q of the RS flip-flop circuit 144, and "low" level voltage is output to the transistor Tr141.

The transistor Tr141 is composed of a P-channel type MOSFET. Its source is connected to the ground terminal te0, its gate is connected to the output terminal of the OR circuit 151, and its drain is connected to the first output terminal te2. Further, the drain of the transistor Tr141 is connected to the power supply terminal te1 via the resistor R143. As a result of this, when a level of an output voltage of the OR circuit 151 is "high", the transistor Tr141 is switched off and a level of voltage of the first output terminal te2 becomes "high". On the other hand, when a level of the output voltage of the OR circuit 151 is "low", the transistor Tr141 is switched on and a level of voltage of the first output terminal te2 becomes "low".

<3> Operation of LED Module 1

Figure 3:
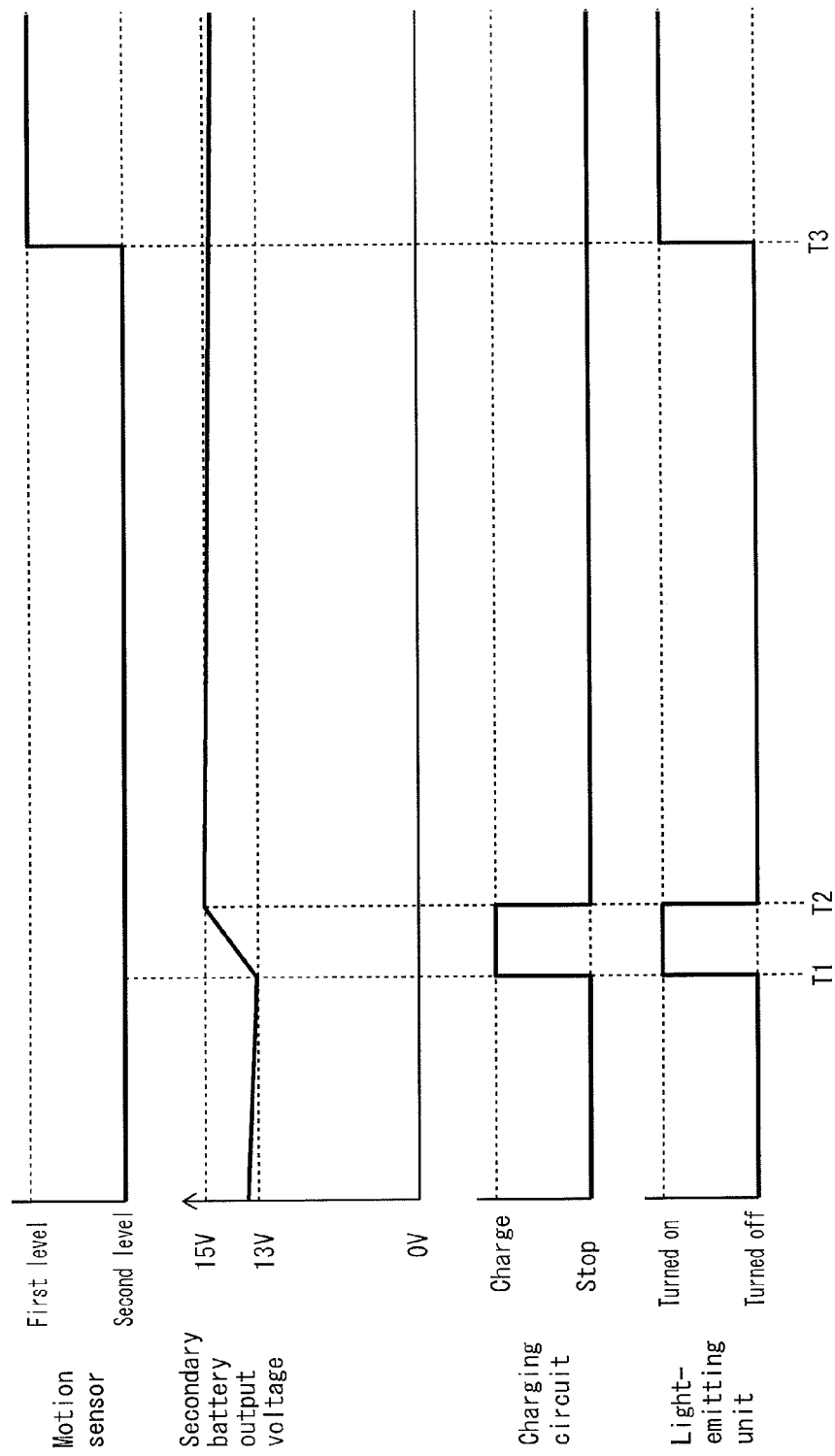
FIG. 3 is a timing diagram for explaining operations of an LED module pertaining to Embodiment 1.
Figure 4:
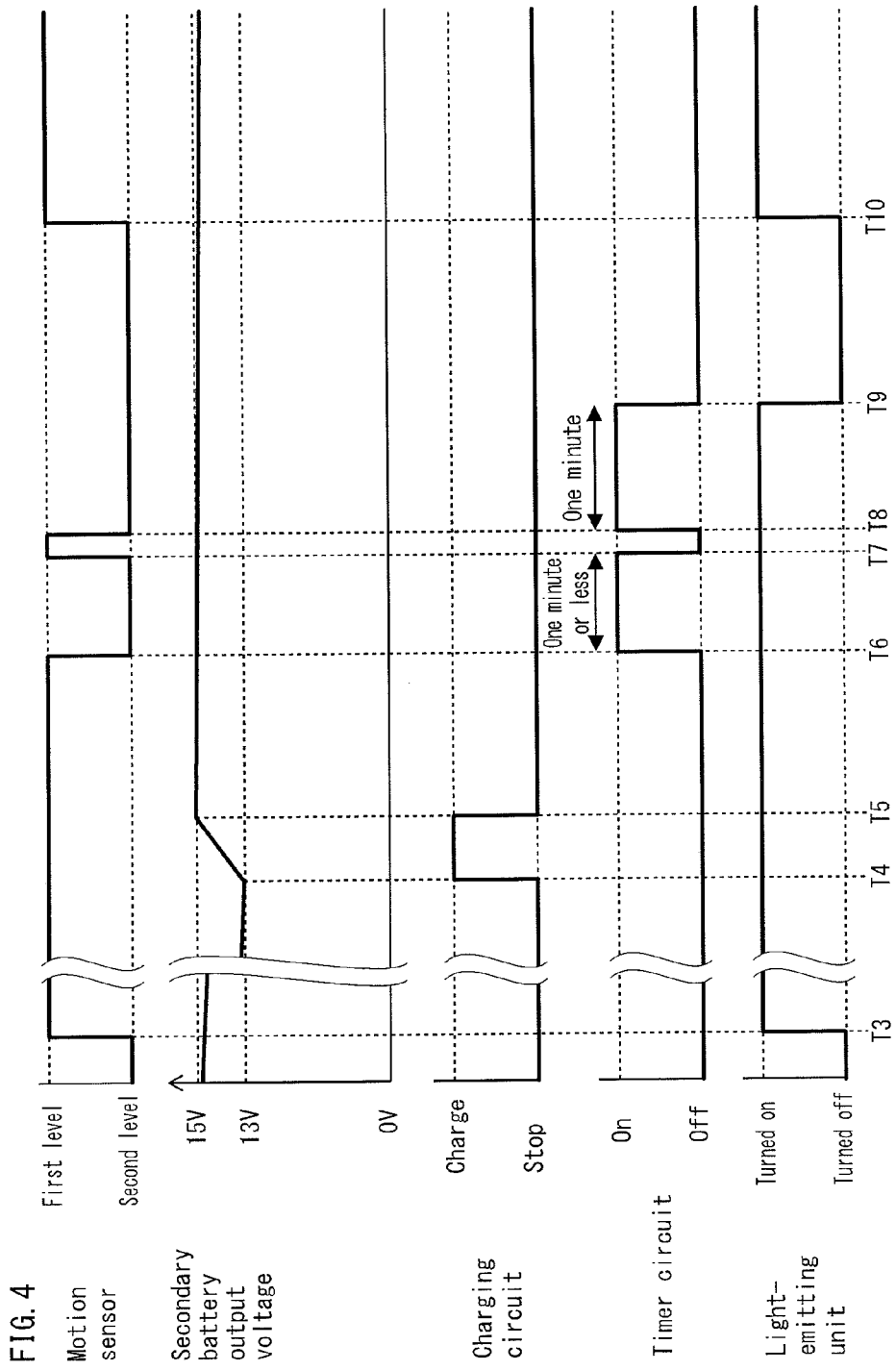
FIG. 4 is a timing diagram for explaining operations of the LED module pertaining to Embodiment 1.

FIGS. 3 and 4 each show a timing diagram showing operations of the LED module 1 pertaining to the present embodiment. Note that during a time period shown in FIG. 3, operations of the timer circuit 150 are omitted. The following description refers to FIGS. 3 and 4.

<When Sensor Unit 12 Does Not Detect Person>

When the sensor unit 12 does not detect a person, voltage input from the output terminal te12 of the sensor unit 12 to the sensor input terminal te3 of the control circuit 14 is maintained at the second level (from time T2 to T3 in FIG. 3). At this time, a level of voltage of the first output terminal te2 of the control circuit 14 is "low". This switches the transistor Tr2 of the power interrupt circuit 13 off, and the transistor Tr1 is switched off. In this way, the power supply from the lighting device 2 to the light-emitting unit 11 is interrupted, and the light-emitting unit 11 is turned off.

While the power supply from the lighting device 2 to the light-emitting unit 11 is being interrupted, an anode potential of the diode D1 is lower than a cathode potential of the diode D1, and the diode D1 is off. On the other hand, voltage between the ends of the capacitor C2 is reduced to voltage lower than the output voltage of the secondary battery 16 by a turn-on voltage of the diode D2, and the diode D2 is on. The control circuit 14 and the sensor unit 12 are supplied with the output voltage of the secondary battery 16.

<When Sensor Unit 12 Detects Person>

When the sensor unit 12 detects a person, the first level voltage is input to the sensor input terminal te3 of the control circuit 14 from the output terminal te12 of the sensor unit 12 (time T3 in FIG. 3). At this time, a level of voltage of the first output terminal te2 of the control circuit 14 is "high". This switches on the transistor Tr2 of the power interrupt circuit 13, current flows from the base of the transistor Tr1 via the resistor R2, and the transistor Tr1 is switched on. In this way, current is supplied from the lighting device 2 to the light-emitting unit 11, and the light-emitting unit 11 is turned on.

While power is being supplied from the lighting device 2 to the light-emitting unit 11, current flows through each LED 11a and a potential of the anode of the diode D1 increases. When voltage between the anode and the cathode of the diode D1 reaches the turn-on voltage of the diode D1, the diode D1 is switched on. At this time, voltage between the ends of the capacitor C2 is higher than the output voltage of the secondary battery 16, and the diode D2 is switched off.

As a result of this, the control circuit 14, the sensor unit 12 and the charging circuit 15 are supplied with voltage equivalent to voltage drop between the ends of a series of LEDs belonging to the first group A1 among the plurality of LEDs 11a in the light-emitting unit 11. At this time, current flows in the capacitor C2 from the light-emitting unit 11 via the diode D1, and the capacitor C2 is also charged.

As described above, when the sensor unit 12 does not detect a person, the transistor Tr1 is switched off and the power supply from the lighting device 2 to the light-emitting unit 11 is interrupted, and the light-emitting unit 11 becomes unable to supply voltage to the control circuit 14. However, according to the LED module 1 pertaining to the present embodiment, while the power supply from the lighting device 2 to the light-emitting unit 11 is being interrupted, the control circuit 14 and the sensor unit 12 are supplied with voltage from the secondary battery 16, and the control circuit 14 and the sensor unit 12 are always being operated. As a result of this, even while the power supply from the lighting device 2 to the light-emitting unit 11 is being interrupted, the sensor unit 12 can detect a person and the light-emitting unit 11 can be turned on again.

<In Cases Where Output Voltage of Secondary Battery Decreases When Sensor Unit Does Not Detect Person>

As shown in FIG. 3, if the sensor unit 12 does not detect a person for a long time, the secondary battery 16 is not charged for a long time, and the output voltage of the secondary battery 16 decreases.

According to the LED module 1 pertaining to the present embodiment, when the sensor unit 12 does not detect a person and the output voltage of the secondary battery 16 becomes lower than the lower limit of the reference voltage range, the control circuit 14 forces the transistor Tr1 of the power interrupt circuit 13 to be switched on regardless of output of the sensor unit 12. Subsequently, the control circuit 14 supplies the charging circuit 15 with voltage from the light-emitting unit 11 via the diode D1, and charges the secondary battery 16 by using current supplied to the secondary battery 16 from the charging circuit 15.

When the sensor unit 12 does not detect a person and the output voltage of the secondary battery 16 reduces to the lower limit (13 V) of the reference voltage range (time T1 in FIG. 3), the charging circuit 15 supplies current to the secondary battery 16 to charge the secondary battery 16. At the same time, current is supplied from the lighting device 2 to the light-emitting unit 11, and the light-emitting unit 11 is turned on.

Here, the control circuit 14 switches the transistor Tr1 on by inputting "high" level voltage to the gate of the transistor Tr2 of the power interrupt circuit 13. This causes the lighting device 2 to supply power to the light-emitting unit 11, and the light-emitting unit 11 is turned on. At the same time, the control circuit 14 inputs "high" level voltage to the charging circuit 15 to switch the transistor Tr15 of the charging circuit 15 on, and supplies current to the secondary battery 16 to charge the secondary battery 16. Here, the charging circuit 15 continues to charge the secondary battery 16 as long as the control circuit 14 continues to input "high" level voltage to the charging circuit 15.

After charging of the secondary battery 16 starts, the output voltage of the secondary battery 16 increases over time (from time T1 to time T2 in FIG. 3).

Subsequently, when the output voltage of the secondary battery 16 reaches the upper limit (15 V) of the reference voltage range (time T2 in FIG. 3), charging of the secondary battery 16 is stopped.

Here, the control circuit 14 switches the transistor Tr15 of the charging circuit 15 off by inputting "low" level voltage to the gate of the transistor Tr15. This interrupts current supply from the charging circuit 15 to the secondary battery 16. At this time, the control circuit 14 switches the transistor Tr1 off by inputting "low" level voltage to the gate of the transistor Tr2 of the power interrupt circuit 13. This interrupts the power supply from the lighting device 2 to the light-emitting unit 11, and the light-emitting unit 11 is turned off.

As described above, the power supply terminal te1 of the control circuit 14 and the power supply terminal tell of the sensor unit 12 are always supplied with voltage greater than the lower limit (13 V) of the reference voltage range. This prevents operation failure of the sensor unit 12 and the control circuit 14.

Further, when the output voltage of the secondary battery 16 reaches the upper limit (15 V) of the reference voltage range, the control circuit 14 causes the charging circuit 15 to stop charging the secondary battery 16. This prevents shortening of the lifetime of the secondary battery 16 by not causing overcharging of the secondary battery 16.

Furthermore, when the secondary battery 16 is charged until the output voltage of the secondary battery 16 reaches the upper limit of the reference voltage range, the control circuit 14 switches the transistor Tr1 of the power interrupt circuit 13 off. This prevents unnecessary consumption of power by the light-emitting unit 11 while there is no one in the lighting space and it is unnecessary to turn on the light-emitting unit 11.

<In Cases Where Output Voltage of Secondary Battery Decreases When Sensor Unit Detects Person>

According to the LED module 1 pertaining to the present embodiment, while the sensor unit 12 is detecting a person and the output voltage of the secondary battery 16 becomes lower than the lower limit of the reference voltage range, the charging circuit 15 supplies current to the secondary battery 16 to charge the secondary battery 16. The following describes this operation with reference to the FIG. 4.

As shown in FIG. 4, when the sensor unit 12 detects a person (time T3 in FIG. 4), the first level voltage is input from the output terminal te12 of the sensor unit 12 to the sensor input terminal te3 of the control circuit 14. The control circuit 14 switches the transistor Tr1 on by inputting "high" level voltage to the gate of the transistor Tr2 of the power interrupt circuit 13. This causes the lighting device 2 to supply power to the light-emitting unit 11, and the light-emitting unit 11 is turned on.

Subsequently, when the output voltage of the secondary battery 16 becomes lower than the lower limit (13 V) of the reference voltage range (time T4 in FIG. 4), the control circuit 14 switches the transistor Tr15 on by inputting "high" level voltage to the gate of the transistor Tr15 of the charging circuit 15. This causes the charging circuit 15 to continue to charge the secondary battery 16 as long as the control circuit 14 continues to input "high" level voltage to the charging circuit 15. At this time, the output voltage of the secondary battery 16 increases over time (from time T4 to time T5 in FIG. 4). Subsequently, when the output voltage of the secondary battery 16 reaches the upper limit (15 V) of the reference voltage range (time T5 in FIG. 4), charging of the secondary battery 16 is stopped.

Here, the control circuit 14 switches the transistor Tr15 off by inputting "low" level voltage to the gate of the transistor Tr15 of the charging circuit 15. This interrupts current supply from the charging circuit 15 to the secondary battery 16.

As described above, when the output voltage of the secondary battery 16 reaches the upper limit (15 V) of the reference voltage range, the control circuit 14 causes the charging circuit 15 to stop charging the secondary battery 16. As a result of this, the output voltage of the secondary battery 16 does not exceed the upper limit (15 V) of the reference voltage range, and does not exceed voltage occurring between the ends of a series of LEDs 11a belonging to the first group A1 among the plurality of LEDs 11a in the light-emitting unit 11.

Therefore, when the sensor unit 12 detects a person, the control circuit 14 and the sensor unit 12 are always supplied with voltage not from the secondary battery 16 but from the light-emitting unit 11. It is therefore possible to prevent rapid decrease of the output voltage of the secondary battery 16 by shortening a time period in which discharge is caused by the secondary battery 16.

<Timing at Which Light-Emitting Unit is Turned Off>

If the light-emitting unit 11 is designed to be turned off immediately after the sensor unit 12 stops detecting a person, the lighting space becomes dark at the moment when a person who is in the lighting space goes out of the lighting space, and it might cause discomfort to the person. Also, as described above, if the sensor unit 12 is designed to detect a person by detecting motion of the person, the sensor unit 12 might mistakenly determine that there is no one in the lighting space when the person stops moving only for a few seconds. In that case, the light-emitting unit 11 might be turned off even when the person is in the lighting space.

The LED module 1 pertaining to the present embodiment continues to turn the light-emitting unit 11 on until a predetermined time period (e.g., one minute) elapses since the sensor unit 12 stops detecting a person, and the LED module 1 turns the light-emitting unit 11 off when the sensor unit 12 still does not detect a person when the predetermined time elapses. The following describes this operation with reference to the FIG. 4.

When the sensor unit 12 stops detecting a person and an output voltage of the sensor unit 12 decreases from the first level to the second level (time T6 in FIG. 4), a negative pulse voltage is input from the differentiating circuit 145 to the counter 147 and the timer circuit 150 is switched on in the control circuit 14. Subsequently, "high" level voltage is input from the control circuit 14 to the gate of the transistor Tr2 of the power interrupt circuit 13, and this maintains the transistor Tr1 to be in the on-state. The lighting device 2 continues to supply power to the light-emitting unit 11, and the light-emitting unit 11 is maintained to be turned on.

As shown in FIG. 4, if the sensor unit 12 detects a person again within one minute after the timer circuit 150 is switched on and the output voltage of the sensor unit 12 increases from the second level to the first level (time T7 in FIG. 4), the timer circuit 150 is switched off.

Subsequently, when the sensor unit 12 stops detecting a person again and the output voltage of the sensor unit 12 decreases from the first level to the second level (time T8 in FIG. 4), a negative pulse voltage is input again from the differentiating circuit 145 to the counter 147, and the timer circuit 150 is switched on in the control circuit 14. When the sensor unit 12 still does not detect a person when one minute elapses after the timer circuit 150 is switched on (time T9 in FIG. 4), "low" level voltage is input from the control circuit 14 to the gate of the transistor Tr2 of the power interrupt circuit 13. This switches the transistor Tr1 off and interrupts the power supply from the lighting device 2 to the light-emitting unit 11, and the light-emitting unit 11 is turned off. At the same time, the timer circuit 150 is switched off.

Subsequently, when the sensor unit 12 detects a person again (time T10 in FIG. 4), power is supplied from the lighting device 2 to the light-emitting unit 11, and the light-emitting unit 11 is turned on.

Here, "high" level voltage is input from the control circuit 14 to the gate of the transistor Tr2 of the power interrupt circuit 13, and the transistor Tr1 is switched on. This causes the lighting device 2 to supply power to the light-emitting unit 11.

<3> External Representation of Illumination Device

The following describes an example of the LED module 1 pertaining to the present embodiment, and an example of an illumination device including the LED module 1.

Figure 5A:
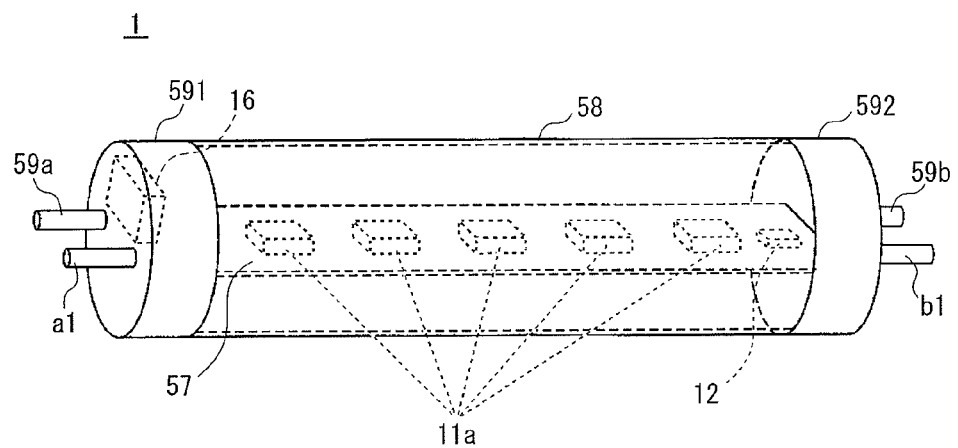
FIG. 5A is a perspective view showing the appearance of the LED module pertaining to Embodiment 1.
Figure 5B:
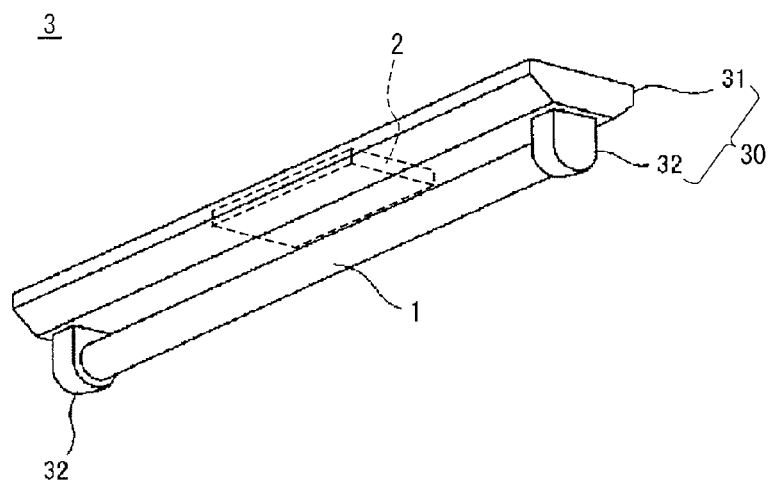
FIG. 5B is a perspective view of an illumination device including the LED module and a lighting device.

FIG. 5A is a perspective view showing the appearance of the LED module 1, and FIG. 5B is a perspective view showing the appearance of the illumination device 3 including the LED module 1 and a lighting fixture 30.

As shown in FIG. 5A, the LED module 1 includes the LEDs 11a, the sensor unit 12, a printed wiring board 57, a shell 58, and first and second lids 591 and 592.

The LEDs 11a are mounted on one surface of the elongated printed wiring board 57 having a rectangular plate-like shape. The LEDs 11a are so-called SMD-type light-emitting diodes. Further, on the other surface of the printed wiring board 57, each of components constituting the power interrupt circuit 13 (not illustrated) and IC packages constituting the charging circuit 15 and the control circuit 14 are implemented.

The tubular shell 58 is formed of a light-transmissive member, and houses therein the printed wiring board 57. The first lid 591 and the second lid 592 cover both ends of the shell 58 in the longitudinal direction thereof, and end portions of the printed wiring board 57 are fixed to the inner surfaces of the first and second lids 591 and 592. The inside surface of the first lid 591 is provided with the secondary battery 16. Also, the positive terminal a1 and a dummy terminal 59a are formed to project from the first lid 591. The positive terminal a1 and the dummy terminal 59a each have a shape of a round pin. Similarly, the negative terminal b1 and a dummy terminal 59b are formed to project from the second lid 592. The negative terminal b1 and the dummy terminal 59b each have a shape of a round pin. The dummy terminals 59a and 59b are for fixing the LED module 1 to the lighting fixture 30 (see FIG. 5B), and do not have the function of supplying power.

As shown in FIG. 5B, the illumination device 3 includes the LED module 1, and the lighting fixture 30 to which the LED module 1 is attached. The lighting fixture 30 includes a fixture body 31, a pair of sockets and the lighting device 2. The fixture body 31 is directly fixed to the ceiling. The pair of sockets are provided on the fixture body 31, and the LED module 1 is detachably attached to the sockets. The lighting device 2 is housed in the fixture body 31.

The fixture body 31 has a shape of an elongated rectangular tube. When viewed in the longitudinal direction of the fixture body 31, the shape of the fixture body 31 is trapezoidal. The fixture body 31 houses therein the lighting device 2. Both ends of a bottom surface of the fixture body 31 are provided with the sockets 32. The sockets 32 each have substantially the same structure as a socket used for a known straight fluorescent lamp. The positive terminal a1 and the negative terminal b1 of the LED module 1 are electrically connected to the positive terminal a2 and the negative terminal b2 of the lighting device 2 via the sockets 32.

In the illumination device 3 pertaining to the present embodiment, the LED module 1 may be replaced with an LED module that does not include a motion sensor. That is, the illumination device 3 may be used when an LED module that does not include a motion sensor is attached to the lighting fixture 30 constituting part of the illumination device 3.

<4> Effect by LED Module 1

The LED module 1 pertaining to the present embodiment supplies the control circuit 14 with voltage equivalent to voltage drop between the ends of the first group A1 in the light-emitting unit 11 while the lighting device 2 is supplying power to the light-emitting unit 11. The voltage equivalent to voltage drop between the ends of the first group A1 is generated by dividing voltage applied to both ends of the light-emitting unit 11, and a fraction of the voltage is lower than an output voltage of the lighting device 2.

Accordingly, even when the driving voltage of the control circuit 14 is lower than the output voltage of the lighting device 2, the LED module 1 does not need a dedicated voltage-down circuit and the like that reduce the output voltage of the lighting device 2 to the driving voltage of the control circuit 14, and accordingly the size of the circuit can be small and the LED module 1 is downsized.

Furthermore, while the power supply from the lighting device 2 to the lighting unit 11 is being interrupted, the voltage supply circuit 17 supplies the control circuit 14 with voltage output from the secondary battery 16. This enables the control circuit 14 to continue to be supplied with voltage, even when the power supply from the lighting device 2 to the lighting unit 11 is interrupted. Accordingly, even while the power supply from the lighting device 2 to the light-emitting unit 11 is being interrupted, the control circuit 14 can control the power interrupt circuit 13 according to output of the sensor unit 12, and resume the power supply from the lighting device 2 to the light-emitting unit 11. That is, the control circuit 14 can maintain the function of turning on and off the LED 11a according to output of the sensor unit 12.

It is known that voltage in the forward direction of the LEDs 11a is substantially constant against fluctuations in voltage of the input edge and in input current. Accordingly, voltage occurring between the ends of LEDs belonging to the first group A1 among the plurality of LEDs 11a in the light-emitting unit 11 is divided, and a fraction of the voltage is equivalent to stable voltage drop on which fluctuations in voltage of the input edge and in input current have little effect. In the LED module 1, the control circuit 14 or the like are supplied with the voltage equivalent to voltage drop occurring between the ends of a series of LEDs belonging to the first group A1 among the plurality of LEDs 11a. This prevents operation failure of the control circuit 14 and the like.

Further, when the output voltage of the secondary battery 16 reaches the upper limit of the reference voltage range, the control circuit 14 causes the charging circuit 15 to stop charging the secondary battery 16. This prevents shortening of the lifetime of the secondary battery 16 by not causing overcharging of the secondary battery 16.

Also, the control circuit 14 resumes the power supply from the lighting device 2 to the light-emitting unit 11 in the case where the secondary battery 16 needs to be charged even when there is no one in the lighting space. When the secondary battery 16 is charged until the output voltage of the secondary battery 16 reaches the upper limit of the reference voltage range after the control circuit 14 resumes the power supply from the lighting device 2 to the light-emitting unit 11, the control circuit 14 switches the transistor Tr1 of the power interrupt circuit 13 off. Consequently, unnecessary consumption of power by the light-emitting unit 11 can be prevented while there is no one in the lighting space and it is unnecessary to turn on the light-emitting unit 11.

Further, when the sensor unit 12 detects a person, a voltage supply from the light-emitting unit 11 to the control circuit 14 and the sensor unit 12 is prioritized over a voltage supply from the secondary battery 16. This prevents rapid decrease of the output voltage of the secondary battery 16 by shortening a time period in which discharge is caused by the secondary battery 16.

<Embodiment 2>

Figure 6:
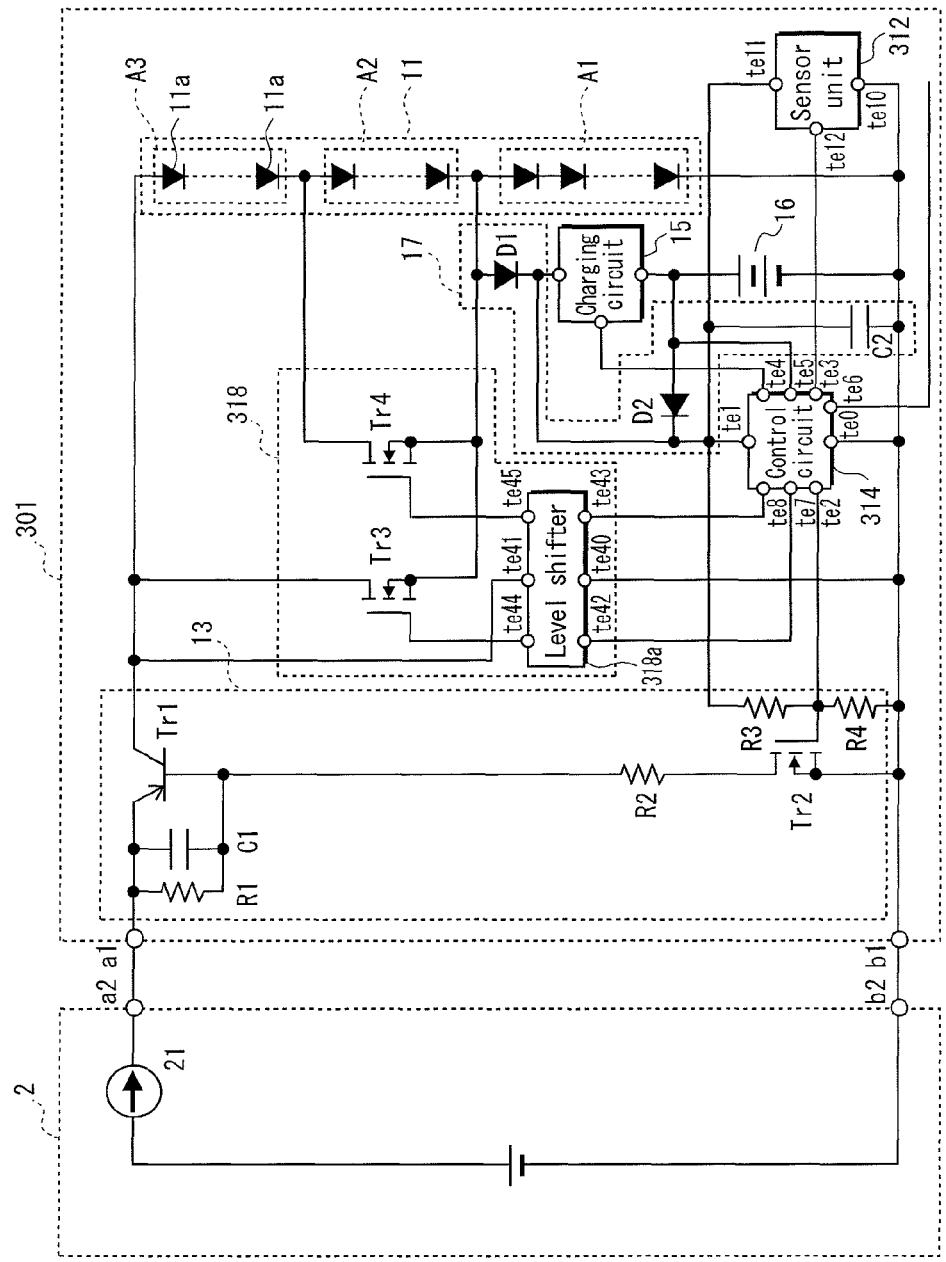
FIG. 6 is a circuit diagram of an LED module and a lighting device pertaining to Embodiment 2.

FIG. 6 is a circuit diagram of an LED module 301 and the lighting device 2 pertaining to the present embodiment.

The LED module 301 is different from the LED module pertaining to Embodiment 1 in that the LED module 301 includes a dimmer switch circuit 318, and that the dimmer switch circuit 318 adjusts dimming levels by changing an amount of power to be output to the light-emitting unit 11 from the lighting device 2. Further, the LED module 301 is different from the LED module pertaining to Embodiment 1 in the structure of the control circuit 314 and the sensor unit 312. Components identical to those of Embodiment 1 use the same reference numbers, and explanations thereof are omitted below.

<Circuit Structure of LED Module 301>

The plurality of LEDs 11a constituting the light-emitting unit 11 are classified as the first, second and third groups A1, A2 and A3 from the low-potential edge. The voltage supply circuit 17 is connected to the first junction of the first group A1 and the second group A2, and to the second junction of the second group A2 and the third group A3. Here, the first junction is positioned between one of the LEDs 11a that is at the highest potential edge among the plurality of LEDs 11a belonging to the first group A1 and one of the LEDs 11a that is at the lowest potential edge among the plurality of LEDs 11a belonging to the second group A2. Here, the second junction is positioned between one of the LEDs 11a that is at the highest potential edge among the plurality of LEDs 11a belonging to the second group A2 and one of the LEDs 11a that is at the lowest potential edge among the plurality of LEDs 11a belonging to the third group A3.

The sensor unit 312 detects brightness in the lighting space, in addition to a person in the lighting space. That is, the sensor unit 312 serves as a so-called brightness sensor as well as a so-called motion sensor. An output voltage of the sensor unit 312 is approximately 0 V when not detecting a person as the motion sensor. When the sensor unit 312 detects a person as the motion sensor, the output voltage of the sensor unit 312 increases within a range between 0.5 V and 5.0 V inclusive as the brightness around the sensor unit 312 increases.

The dimmer switch circuit 318 includes transistors Tr3 and Tr4, and a level shifter 318a. The dimmer switch circuit 318 causes the light-emitting unit 11 to be turned on at a predetermined dimming rate by switching on and off the transistors Tr3 and Tr4. Here, the transistor Tr3 is composed of an N-channel type MOSFET. Its drain is connected to an anode of one of the LEDs 11a that is at the highest potential edge among the LEDs 11a belonging to the third group A3 in the light-emitting unit 11, and its source is connected to the above first junction. When the transistor Tr3 is switched on, current supplied from the lighting device 2 to the light-emitting unit 11 bypasses the LEDs 11a belonging to the second and third groups A2 and A3, and flows through the LEDs 11a belonging to the first group A1. As a result, only the LEDs 11a belonging to the first group A1 are turned on. The transistor Tr4 is composed of an N-channel type MOSFET. Its drain is connected to the above second junction, and its source is connected to the above first junction. When the transistor Tr4 is switched on, current that is supplied from the lighting device 2 to the light-emitting unit 11 and flows through the third group A3 bypasses the LEDs 11a belonging to the second group A2, and flows through the LEDs 11a belonging to the first group A1. As a result, the LEDs 11a belonging to the first and third groups A1 and A3 are turned on.

Potentials of the sources of the transistors Tr3 and Tr4 are higher than a potential of the ground terminal te0 of the control circuit 314. Accordingly, even if voltage outputs from the first and second control terminals te7 and te8 of the control circuit 314 are input to gates of the transistors Tr3 and Tr4 without change, the transistors Tr3 and Tr4 might not be normally switched on and off.

Because of this, the dimmer switch circuit 318 includes the level shifter 318a that increases a level of voltage output from the first and second terminals te7 and te8 of the control circuit 314, so as to normally switch on and off the transistors Tr3 and Tr4. Details on the level shifter 318a are provided below.

Figure 7:
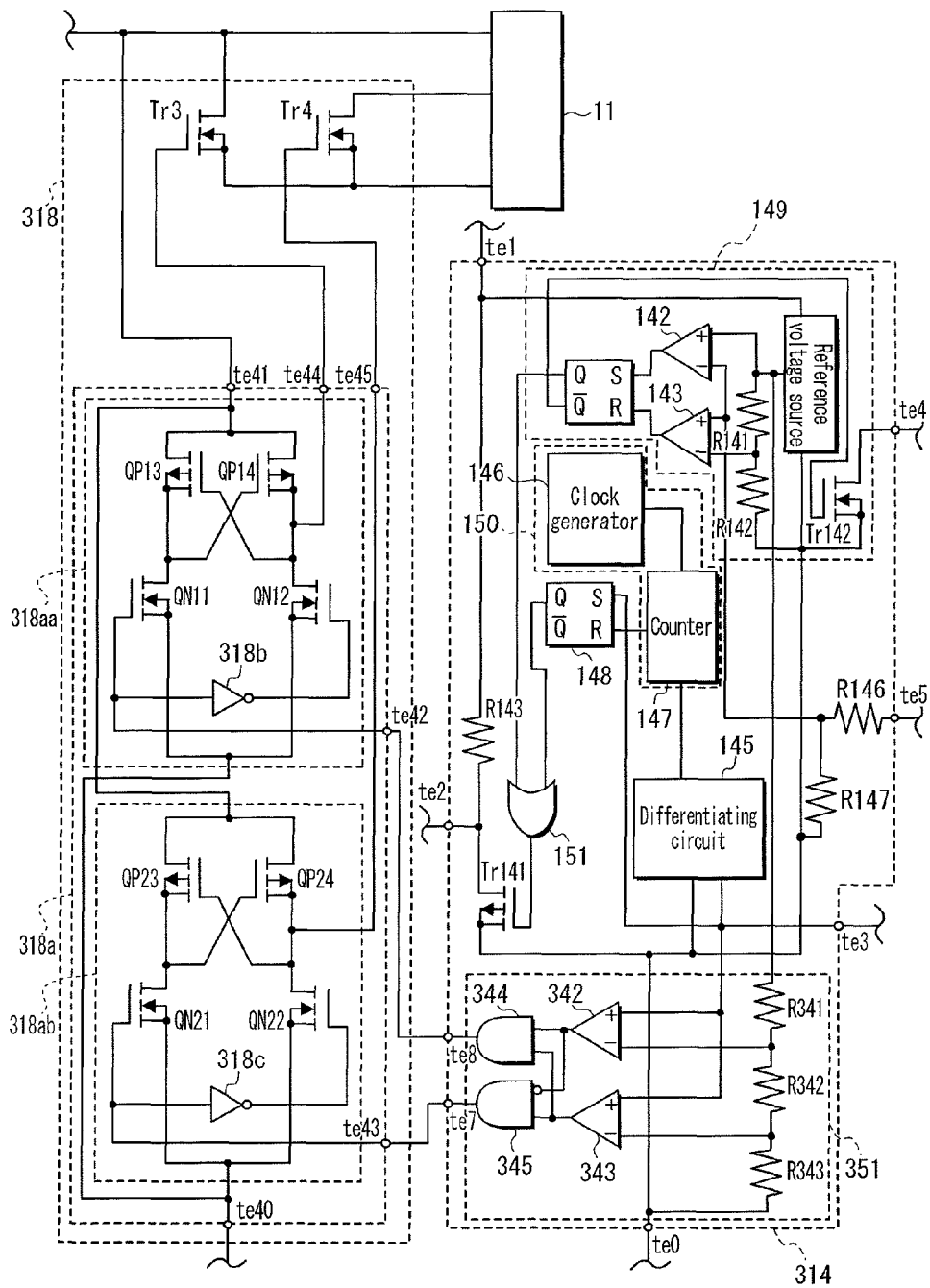
FIG. 7 is a circuit diagram of a control circuit and a dimmer switch circuit pertaining to Embodiment 2.

FIG. 7 is a circuit diagram of the control circuit 314 and the dimmer switch circuit 318.

The control circuit 314 is different from the control circuit 14 pertaining to Embodiment 1 in that the control circuit 314 includes a voltage level detection circuit 351 that detects a voltage level of the sensor input terminal te3. Components identical to those of Embodiment 1 use the same reference numbers, and explanations thereof are omitted below.

The voltage level detection circuit 351 includes comparators 342 and 343, AND circuits 344 and 345, and resistors R341, R342 and R343. The resistors R341, R342 and R343 are connected in series to one another between an output terminal of the reference voltage source 141 and the ground terminal te0, and constitute a divider circuit that divides the reference voltage. The comparator 342 has a positive input terminal connected to the sensor input terminal te3, and a negative input terminal connected to a junction of the resistors R341 and R342. The comparator 343 has a positive input terminal connected to the sensor input terminal te3, and a negative input terminal connected to a junction of the resistors R342 and R343. The AND circuit 344 has two input terminals connected to output terminals of the comparators 342 and 343, and an output terminal connected to the second control terminal te8. The AND circuit 345 has an inverting input terminal and a non-inverting input terminal. The inverting input terminal is connected to the output terminal of the comparator 342, and the non-inverting input terminal is connected to the output terminal of the comparator 343. The output terminal of the AND circuit 345 is connected to the first control terminal te7. With this structure, the comparator 342 compares voltage input to the sensor input terminal te3 and voltage occurring at the junction of the resistors R341 and R342. Also, the comparator 343 compares voltage input to the sensor input terminal te3 and voltage occurring at the junction of the resistors R342 and R343. A result of an AND operation between the outputs of the comparators 342 and 343 is output to the second control terminal te8. A result of an AND operation between the inverted output of the comparator 342 and the output of the comparator 343 is output to the first control terminal te7. Here, resistances of the resistors R341, R342 and R343 are determined based on a voltage boundary value of the sensor input terminal te3. For example, when the reference voltage is applied to the divider circuit composed of the resistors R341, R342 and R343, the resistances of the resistors R341, R342 and R343 are determined such that voltage occurring at the junction of the resistors R341 and R342 is 3.5 V, and voltage occurring at the junction of the resistors R342 and R343 is 2.0 V.

By employing the above structure, when voltage of the sensor input terminal te3 is not greater than voltage occurring at the junction of the resistors R342 and R343, both levels of voltages of the first control terminal te7 and the second control terminal te8 become "low".

When voltage of the sensor input terminal te3 is greater than voltage occurring at the junction of the resistors R342 and R343 and not greater than voltage occurring at the junctions of the resistors R341 and R342, a level of voltage of the first control terminals te7 becomes "high", and a level of voltage of the second control terminal te8 becomes "low".

When voltage of the sensor input terminal te3 is greater than voltage occurring at the junction of the resistors R341 and R342, a level of voltage of the first control terminal te7 becomes "low" and a level of voltage of the second control terminal te8 becomes "high".

The level shifter 318a includes a ground terminal te40, a power supply terminal te41, the first and second input terminals te42 and te43, the first and second output terminals te44 and te45, the first level shift circuit 318aa, and the second level shift circuit 318ab. The first input terminal te42 is connected to the second control terminal te8 of the control circuit 314, and the second input terminal te43 is connected to the first control terminal te7 of the control circuit 314.

The first level shift circuit 318aa includes transistors QN11 and QN12 each composed of an N-channel type MOSFET, transistors QP13 and QP14 each composed of a P-channel type MOSFET, and an inverter 318b. The first level shift circuit 318aa pulls up voltage input from the first input terminal te42 to a voltage level of the power supply terminal te41, and outputs the pulled voltage from the first output terminal te44. By pulling up the voltage, even if the source potential of the transistor Tr3 increases up to a level of voltage between the ends of a series of LEDs belonging to the first group A1 among the plurality of LEDs 11a in the light-emitting unit 11, the transistor Tr3 can be switched on.

The second level shift circuit 318ab includes transistors QN21 and QN22 each composed of an N-channel type MOSFET, transistors QP23 and QP24 each composed of a P-channel type MOSFET, and an inverter 318c. The second level shift circuit 318ab pulls up voltage input from the second input terminal te43 to a voltage level of the power supply terminal te41, and outputs the pulled voltage from the second output terminal te45. By pulling up the voltage, even if the source potential of the transistor Tr4 increases up to a level of voltage between the ends of a series of LEDs belonging to the first group A1 among the plurality of LEDs 11a in the light-emitting unit 11, the transistor Tr4 can be switched on.

In the LED module 301 pertaining to the present embodiment, the sources of the transistors Tr3 and Tr4 are connected to the high-potential edge of the plurality of LEDs 11a belonging to the first group A1, and the low-potential edge of the plurality of LEDs 11a belonging to the first group A1 is connected to the negative terminal b1. Here, in both fully lighting and dim lighting, current flows through the plurality of LEDs 11a belonging to the first group A1. Accordingly, in both fully lighting and dim lighting, voltage occurring between the ends of a series of LEDs belonging to the first group A1 among the plurality of LEDs 11a can be supplied to the control circuit 314, the sensor unit 312 and the charging circuit 15.

<Operation of LED Module 301>

The following describes operations of the LED module 301 pertaining to the present embodiment.

First, the relationship between voltage input to the sensor input terminal te3 of the control circuit 314 and switching on and off of the transistors Tr3 and Tr4 is described with reference to FIG. 7.

For example, in the voltage level detection circuit 314, voltage occurring at the junction of the resistors R341 and R342 is 3.5 V, and voltage occurring at the junction of the resistors R342 and R343 is 2.0 V.

The following describes the case where the sensor unit 312 is detecting a person.

When voltage input to the sensor input terminal te3 is not greater than 2.0 V, each of comparators 342 and 343 outputs "low" level voltage, and each of the AND circuits 344 and 345 outputs "low" level voltage. This switches both the transistors Tr3 and Tr4 off. In this state, current flows through all of the LEDs 11a belonging to the first group A1 through the third group A3 in the light-emitting unit 11. This turns on all of the LEDs 11a belonging to the first group A1 through the third group A3. In the following example, the dimming rate of the light-emitting unit 11 at this time is 100%.

When voltage input to the sensor input terminal te3 is greater than 2.0 V and not greater than 3.5 V, the comparator 342 outputs "low" level voltage, and the comparator 343 outputs "high" level voltage. Then the AND circuit 344 outputs "low" level voltage, and the AND circuit 345 outputs "high" level voltage. This switches the transistor Tr3 off, and switches the transistor Tr4 on. In this state, current does not flow through the LEDs 11a belonging to the second group A2 in the light-emitting unit 11, and current flows through only the LEDs 11a belonging to the first group A1 and the third group A3 in the light-emitting unit 11. This turns on the LEDs 11a belonging to the first group A1 and the third group A3, and turns off the LEDs 11a belonging to the second group A2. At this time, the dimming rate of the light-emitting unit 11 is approximately 70%.

When voltage input to the sensor input terminal te3 is greater than 3.5 V, each of comparators 342 and 343 outputs "high" level voltage, the AND circuit 344 outputs "high" level voltage, and the AND circuit 345 outputs "low" level voltage. This switches the transistor Tr3 on, and switches the transistor Tr4 off. In this state, current does not flow through the LEDs 11a belonging to the second group A2 and the third group A3 in the light-emitting unit 11, and current flows through only the LEDs 11a belonging to the first group A1 in the light-emitting unit 11. This turns on the LEDs 11a belonging to the first group A1, and turns off the LEDs 11a belonging to the second group A2 and the third group A3. At this time, the dimming rate of the light-emitting unit 11 is approximately 40%.

The following describes the case where the sensor unit 312 is not detecting a person.

In this case, voltage from the output terminal te12 of the sensor unit 312 to the sensor input terminal te3 of the control circuit 314 is approximately 0 V. Then "low" level voltage is input to the gate of the transistor Tr2 of the power interrupt circuit 13 from the first output terminal te2 of the control circuit 314, and the transistor Tr2 is switched off, and at the same time, the transistor Tr1 is switched off. Also, the power supply from the lighting device 2 to the light-emitting unit 11 is interrupted, all of the LEDs 11a belonging to the first group A1 through the third group A3 in the light-emitting unit 11 are turned off. Further, as described above, voltage input from the sensor unit 312 to the sensor input terminal te3 is approximately 0 V. Since this is not greater than 2.0 V, both the transistors Tr3 and Tr4 are off.

As described above, brightness of the light-emitting unit 11 varies by an on-state and an off-state of each of the transistors Tr3 and Tr4. FIG. 8 shows a table of the relationship between voltage input to the sensor input terminal te3 of the control circuit 314 and an on-state/off-state of each of the transistors Tr3 and Tr4.

<Effect by LED Module 301>

In the LED module 301 of the present embodiment, while power is being supplied from the lighting device 2 to the light-emitting unit 11, current flows through the first group A1 in the light-emitting unit 11, and the control circuit 314 is supplied with voltage equivalent to voltage drop between the ends of a series of LEDs belonging to the first group A1 among the plurality of LEDs 11a. With this structure, the LED module 301 does not need a dedicated voltage-down circuit and the like that reduce the output voltage of the lighting device 2 to the driving voltage of the control circuit 314, and accordingly the size of the circuit can be small.

Further, while the power supply from the lighting device 2 to the lighting unit 11 is being interrupted, the voltage supply circuit 17 supplies the control circuit 314 with voltage output from the secondary battery 16. Accordingly, even if the power supply from the lighting device 2 to the light-emitting unit 11 is interrupted, a voltage supply to the control circuit 314 is continued, and the control circuit 314 can maintain the function of turning on and off the LEDs 11a according to output of the sensor unit 312.

Further, in the LED module 301, the dimmer switch circuit 318 is also controlled according to the detection result of the sensor unit 312, and power supplied to the light-emitting unit 11 is adjusted. While the sensor unit 312 is detecting a person, as the output voltage of the sensor unit 312 increases (i.e., as ambient brightness of the sensor unit 312 increases), the dimming rate of the light-emitting unit 11 is reduced. This can reduce power consumed by the light-emitting unit 11, and accordingly energy conservation can be achieved.

On the other hand, when the output voltage of the sensor unit 312 decreases (i.e., as ambient brightness of the sensor unit 312 decreases), the dimming rate of the light-emitting unit 11 is increased. This guarantees the brightness of the lighting space, and maintains comfort in the lighting space.

<Modification Pertaining to the Present Embodiment>

In the present embodiment, the dimmer switch circuit 318 includes the two transistors Tr3 and Tr4, and output of the light-emitting unit 11 can be switched to one of the three levels. However, the number of transistors is not limited to two. For example, three or more transistors may be provided, and output of the light-emitting unit 11 may be switched to one of four levels and more. This can more precisely switch output of the light-emitting unit 11, thus achieving energy conservation.

<Embodiment 3>

Figure 9:
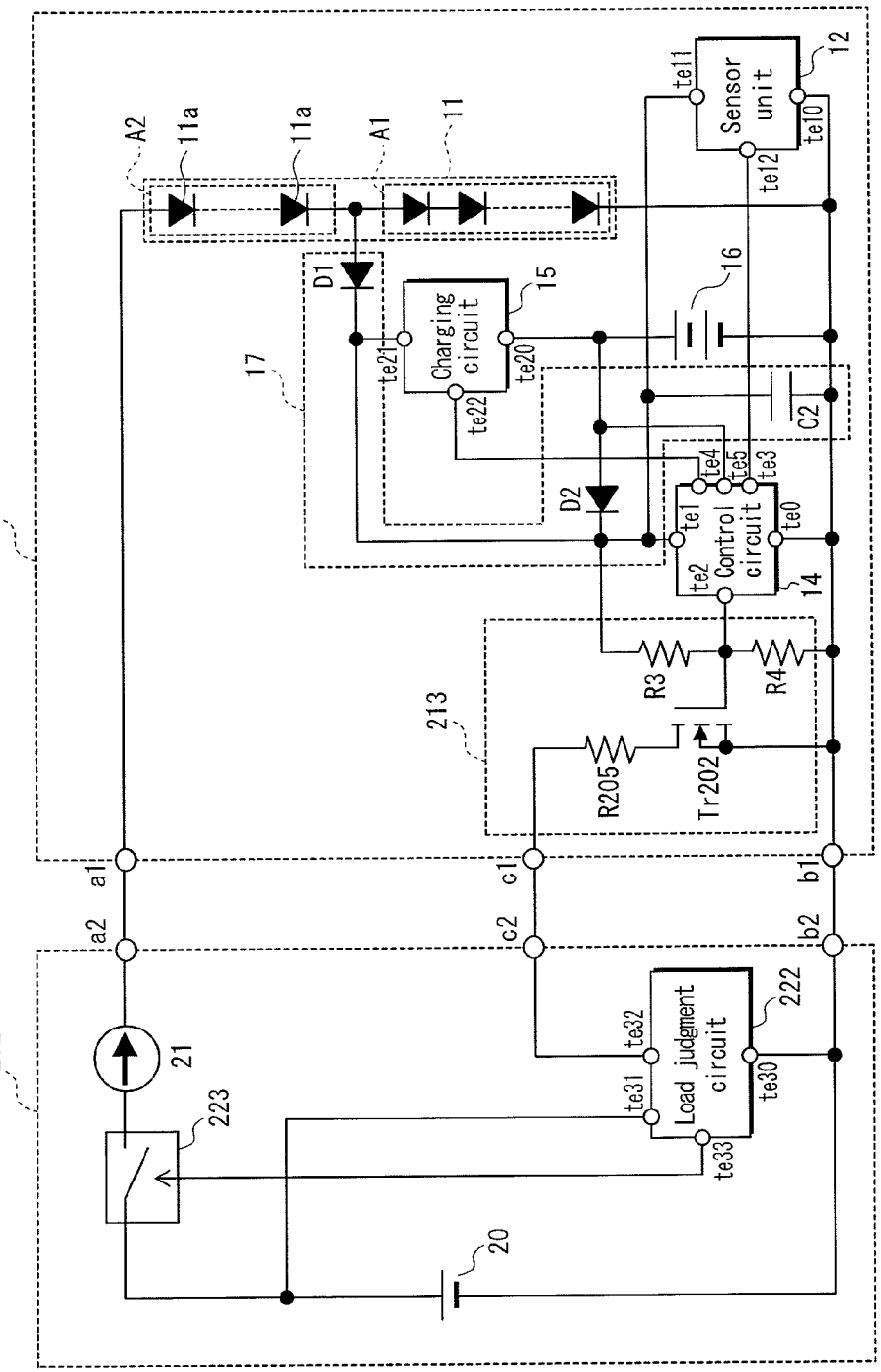
FIG. 9 is a circuit diagram of an LED module and a lighting device pertaining to Embodiment 3.

FIG. 9 is a circuit diagram of an LED module 201 and a lighting device 202 that constitute an illumination device pertaining to the present embodiment.

The LED module 201 is different from the LED module pertaining to Embodiment 1 in that the LED module 201 includes a resistor varying circuit (external output unit) 213 and load judgment terminal c1.

The lighting device 202 is different from the lighting device pertaining to Embodiment 1 in that the lighting device 202 includes a load judgment circuit (power supply control circuit) 222, a load judgment terminal c2, and a power interrupt circuit 223 inserted between the DC power source (first power source) 20 and the constant current source 21.

Components identical to those of Embodiment 1 use the same reference numbers, and explanations thereof are omitted below.

The resistor varying circuit 213 is connected between the load judgment terminal c1 and the negative terminal b1, and varies a resistance between the load judgment terminal c1 and the negative terminal b1 according to voltage from the sensor unit 12 to the sensor input terminal te3. The resistor varying circuit 213 includes a transistor Tr202, resistors R3, R4 and R205, and the load judgment terminal c1. The transistor Tr202 has a source connected to the negative terminal b1, a gate connected to the first output terminal te2 of the control circuit 14, and a drain connected to the load judgment terminal c1 via the load judgment resistor R205. Here, the transistor Tr202 is switched on and off according to a level of voltage (control voltage) of the first output terminal te2 of the control circuit 14. The level of voltage of the first output terminal te2 of the control circuit 14 varies according to voltage from the sensor unit 12 to the sensor input terminal te3, as described in Embodiment 1.

Figure 10:
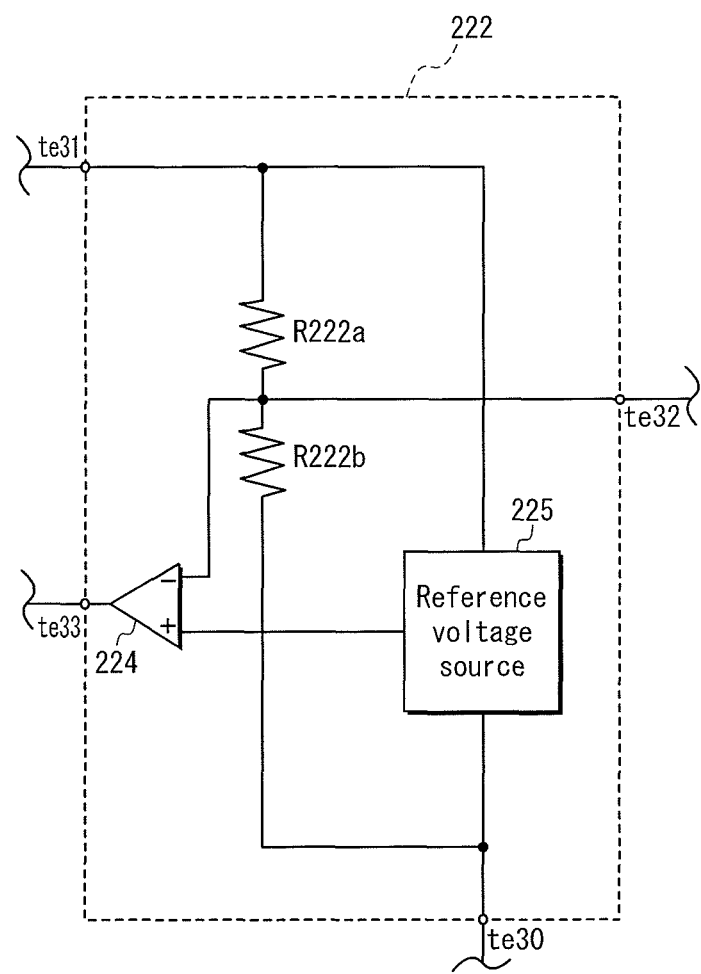
FIG. 10 is a circuit diagram of a load judgment circuit pertaining to Embodiment 3.

FIG. 10 is a circuit diagram of the load judgment circuit 222.

The load judgment circuit 222 is composed of one IC package, and includes a reference voltage source 225, resistors R222a and 222b, a comparator 224, a ground terminal te30, a power supply terminal te31, an input terminal te32 and an output terminal te33.

The reference voltage source 225 is composed of a band-gap regulator, etc., and outputs a constant reference voltage lower than voltage occurring between the power supply terminal te31 and the ground terminal te30. The resistors R222a and 222b are connected in series to each other between the power supply terminal te31 and the ground terminal te30, and a junction of the resistors R222a and R222b is connected to the input terminal te32. The comparator 224 has a positive input terminal of connected to the reference voltage source 225, and a negative input terminal connected to the junction of the resistors R222a and R222b.

The load judgment terminal c2 is connected to the input terminal te32 of the load judgment circuit 222.

Here, the following relational expressions (1) and (2) hold between voltage occurring at the junction of the resistors R222a and R222b of the load judgment circuit 222 and voltage of the DC power source 20.

(when transistor Tr202 is on)

$$VRabon = \frac{\frac{R205 \times R222b}{R205 + R222b}}{R222a + \frac{R205 \times R222b}{R205 + R222b}} \times Vcc = \qquad \text{expression (1)}$$

$$\frac{R205 \times R222b}{R222a \times (R205 + R222b) + R205 \times R222b} \times Vcc$$

(when transistor Tr202 is off)

$$VRaboff = \frac{R222b}{R222a + R222b} \times Vcc \qquad \text{expression (2)}$$

Here, resistances of the resistors R205, R222a and R222b are represented as R205, R222a and R222b, respectively, the output voltage of the DC power source 20 is represented as Vcc, and voltage occurring at the junction of the resistors R222a and R222b of the load judgment circuit 222 is represented as VRabon and VRaboff.

Here, let the reference voltage of the reference voltage source 225 be V0. In this case, the resistances of the resistors R205, R222a and R222b are set so that the relationship (3) holds.

$$VRabon \leq Vo < VRaboff \ldots \text{expression} \qquad (3)$$

Accordingly, when the transistor Tr202 is on and voltage occurring at the junction of the resistors R222a and R222b is VRabon, i.e., not greater than the reference voltage Vo, the comparator 224 output "high" level voltage to the output terminal te33. When the transistor Tr202 is off and voltage occurring at the junction of the resistors R222a and R222b is VRaboff, i.e., greater than the reference voltage Vo, the comparator 224 outputs "low" level voltage to the output terminal te33.

The power interrupt circuit 223 is composed of a semiconductor switch using a transistor, etc. The power interrupt circuit 223 is switched on when a level of voltage input from the load judgment circuit 222 becomes "high", and the power interrupt circuit 223 is switched off when a level of voltage input from the load judgment circuit 222 becomes "low". Note that the power interrupt circuit 223 is not limited to a semiconductor switch, and may be composed of a relay type switch.

The following describes operations of the LED module 201 pertaining to the present embodiment with reference to FIGS. 9 and 10. The following describes operations of the LED module 201 in each of the case where the sensor unit 12 is detecting a person and the case where the sensor unit 12 is not detecting a person.

While the sensor unit 12 is detecting a person, "high" level voltage is input from the output terminal te12 of the sensor unit 12 to the sensor input terminal te3 of the control circuit 14.

Then "high" level voltage is input from the first output terminal te2 of the control circuit 14 to the gate of the transistor Tr202 of the resistor varying circuit 213, and the transistor Tr202 is switched on. At this time, a resistance between the load judgment terminal c1 and the negative terminal b1 is approximately equivalent to the resistance of the resistor R205. In the load judgment circuit 222, voltage occurring at the junction of the resistors R222a and 222b decreases to the reference voltage Vo or less, and "high" level voltage is output from the comparator 224 to the output terminal te33. When "high" level voltage is input from the output terminal te33 of the load judgment circuit 222 to the power interrupt circuit 223, the power interrupt circuit 223 is switched on. The lighting device 202 then supplies voltage to the light-emitting unit 11, and the light-emitting unit 11 is turned on.

At this time, current flows through LEDs 11a belonging to the first group A1 in the light-emitting unit 11, and the diode D1 is switched on and the diode D2 is switched off. The control circuit 14, the sensor unit 12 and the charging circuit 15 are supplied with voltage equivalent to voltage drop between the ends of a series of LEDs belonging to the first group A1 among the plurality of LEDs 11a.

While the sensor unit 12 is not detecting a person, "low" level voltage is input from the output terminal te12 of the sensor unit 12 to the sensor input terminal te3 of the control circuit 14. Then "low" level voltage is input from the first output terminal te2 of the control circuit 14 to the gate of the transistor Tr202 of the resistor varying circuit 213, and the transistor Tr202 is switched off. At this time, the resistance between the load judgment terminal cl and the negative terminal b1 becomes extremely high. Then in the load judgment circuit 222, voltage occurring at the junction of the resistors R222a and 222b becomes greater than the reference voltage Vo, and a level of voltage output from the comparator 224 to the output terminal te33 becomes "low". When a level of voltage from the output terminal te33 of the load judgment circuit 222 to the power interrupt circuit 223 becomes "low", the power interrupt circuit 223 is switched off, the current supply from the lighting device 202 to the light-emitting unit 11 is interrupted, and the light-emitting unit 11 is turned off.

At this time, the current flowing through the LEDs 11a belonging to the first group A1 in the light-emitting unit 11 is interrupted, and the diode D1 is switched off. Subsequently, when voltage between the ends of the capacitor C2 becomes lower than the output voltage of the secondary battery (second power source) 16, the diode D2 is switched on. The output voltage of the secondary battery 16 is supplied to the control circuit 14 and the sensor unit 12.

<Effects of Illumination Device Pertaining to Present Embodiment>

In the illumination device pertaining to the present embodiment, in the similar manner to Embodiment 1, the LED module 201 does not need a dedicated voltage-down circuit and the like that reduce the output voltage of the lighting device 2 to the driving voltage of the control circuit 14. For this reason, the size of the circuit can be small. Further, while the power supply from the lighting device 2 to the lighting unit 11 is being interrupted, the voltage supply circuit 17 supplies the control circuit 14 with voltage output from the secondary battery 16. Therefore, even if the power supply from the lighting device 2 to the light-emitting unit 11 is interrupted, a voltage supply to the control circuit 14 is continued, and the control circuit 14 can maintain the function of turning on and off the LEDs 11a according to output of the sensor unit 312.

Further, in the LED module 201, the resistance between the load judgment terminal c1 and the negative terminal b1 varies according to whether the sensor unit 12 is detecting a person or not. In the lighting device 2, the load judgment circuit 222 turns on and off the power interrupt circuit 223 according to the resistance between the load judgment terminal cl and the negative terminal b1. For this reason, as shown in FIG. 9, even though the power interrupt circuit 223 that interrupts a power supply from the DC power source 20 to the light-emitting unit 11 is provided outside of the LED module 201, operations of the power interrupt circuit 223 can be controlled based on the detection result of the sensor unit 12.

Some straight tube fluorescent lamps (LED modules) manufactured in accordance to the Japan Electric Lamp Manufacturers Association standard JEL801 include a connection judgment resistor and a load judgment terminal (hereinafter, such an LED module is referred to "LED module with connection judgment function"). When such an LED module is normally connected to the lighting device, a resistance between the load judgment terminal and the negative terminal, seen from the side of the lighting device, is approximately the same as a resistance of the connection judgment resistor. On the other hand, when connection failure between the LED module and the lighting device occurs, the resistance between the load judgment terminal and the negative terminal, seen from the side of the lighting device, is extremely large.

The illumination device of the present embodiment is similar to this, and the load judgment terminal c2 of the lighting device 202 is connected to the load judgment terminal of the LED module 201 with connection judgment function.

When connection failure between the lighting device 202 and the LED module 201 occurs and the resistance between the load judgment terminal and the negative terminal increases, the load judgment circuit 222 detects the increase and switches the power interrupt circuit 223 off. This stops a voltage supply from the lighting device 202 to the LED module.

Therefore, it is possible to prevent voltage from being supplied from the lighting device 202 to the LED module while connection failure between the lighting device 202 and the LED module is occurring, and safety can be enhanced.

<Modifications of Embodiments 1-3>

(1) In Embodiments 1-3, the secondary battery 16 is provided as an internal power source, but not limited to this. For example, a primary battery may be provided instead of the secondary battery 16. In this case, the charging circuit 15 may be omitted. As a result of this, the size of the circuit of the LED module 1 can be small.

(2) In Embodiment 1, while the sensor unit 12 is detecting a person (when the light-emitting unit 11 is not turned on) and the output voltage of the secondary battery 16 is lower than the lower limit of the reference voltage range, the transistor Tr1 of the power interrupt circuit 13 is forced to be switched on to charge the secondary battery 16. But the present invention is not limited to this. For example, when the light-emitting unit 11 is not turned on, charging of the secondary battery 16 is not performed at all, and the output voltage of the secondary battery 16 is lower than the lower limit of the reference voltage range while the light-emitting unit 11 is being turned on, charging of the secondary battery 16 may be performed.

(2) In Embodiments 1-3, the light-emitting unit 11 is turned on for a predetermined time period (e.g., one minute) since the sensor unit 12 stops detecting a person. But the present invention is not limited to this. For example, the light-emitting unit 11 is turned off immediately when the sensor unit 12 stops detecting a person. In this case, the control circuit 14 does not need the timer circuit 150, and accordingly, the size of the circuit of the control circuit 14 can be small.

(3) In Embodiments 1-3, the light-emitting unit 11 is composed of the plurality of LEDs 11a, but the present invention is not limited to this. For example, the light-emitting unit 11 may be composed of a light-emitting element using an organic EL element, etc.

(4) In Embodiments 1-3, a lithium-ion battery, etc. is used as the secondary battery 16, but the present invention is not limited to this. For example, double layer capacitors may be used, for example. In this case, the charging circuit 15 is unnecessary, and accordingly the size of the circuit of the LED module can be small.

(5) In Embodiments 1-3, the sensor unit serves as a motion sensor and a brightness sensor. However, the sensor is not limited to this. For example, the sensor may act as a signal receiver that receives a signal transmitted from a signal transmitter (e.g., remote controller) belonging to a person in the lighting space. In the case where a signal is carried by infrared rays, the signal receiver may include an infrared sensor, and a signal processor that demodulates the signal received by the infrared sensor. Further, in the case where a signal is carried by a radio wave, the signal receiver may include an antenna, and a signal processor that demodulates the signal received by the antenna.

(6) In Embodiments 1-3, the charging circuit 15 uses the voltage supply from the light-emitting unit 11 to charge the secondary battery 16. However, a voltage source to the charging circuit 15 is not limited to the light-emitting unit 11. For example, the LED module 1 may include a solar battery, and the charging circuit 15 may use a voltage supply from the solar battery to charge the secondary battery.

(7) The structures described in Embodiments 1-3 and shown in FIGS. 2 and 7 are merely examples, and another structure is possible as far as the same functions are included.

(8) In Embodiment 3, the LED module 201 includes the resistor varying circuit 213. However, the circuit is not limited to the resistor varying circuit 213 if the voltage output from the control circuit 14 can be output to the outside. For example, another logic circuit that outputs the binary level voltage according to voltage of the first output terminal te2 of the control circuit 14 may be employed.

REFERENCE SIGNS LIST 1, 201, 301 LED module
2, 202 lighting device
3 illumination device
11 light-emitting unit
11a LED
12, 312 sensor unit
13, 223 power interrupt circuit
14, 314 control circuit
15 charging circuit
16 secondary battery (internal power source, second power source)
17 voltage supply circuit
20 DC (external power source, first power source)
21 constant current source
30 lighting fixture
31 fixture body
32 socket
57 printed wiring board
58 shell
213 resistor varying circuit (external output unit)
222 load judgment circuit (power supply control circuit)
318 dimmer switch circuit
318a level shifter
591 first lid
592 second lid
a1, a2 positive terminal
b1, b2 negative terminal
c1, c2 load judgment terminal
D1, D2 diode
R205 resistor
Tr1, Tr2, Tr3, Tr4 transistor

The invention claimed is:

1. An LED module comprising:
a light-emitting unit including a plurality of LEDs connected in series to one another;
a sensor unit serving as a motion sensor that detects whether a person exists in a lighting space;
a power interrupt circuit inserted in a power supply path through which the light-emitting unit is supplied with power from an external power source;
a control circuit that controls the power interrupt circuit to adjust an amount of power to be output to the light-emitting unit according to output of the sensor unit;
an internal power source; and
a voltage supply circuit that
supplies the control circuit with voltage equivalent to voltage drop between the ends of a group of LEDs included in the plurality of LEDs while the light-emitting unit is being supplied with power from the external power source, and
supplies the control circuit with voltage output from the internal power source while the power interrupt circuit is interrupting the power supplied from the external power source to the light-emitting unit.

2. The LED module of claim 1, wherein
the internal power source is a secondary battery, and
the LED module further comprises a charging circuit that charges, while the light-emitting unit is being supplied with power from the external power source, the secondary battery with voltage supplied from the voltage supply circuit.

3. The LED module of claim 2, wherein
when the control circuit detects that the voltage output from the internal power source falls to or below a reference voltage while the power interrupt circuit is interrupting the power supplied from the external power source to the light-emitting unit, the control circuit controls the power interrupt circuit such that power supply from the external power source to the light-emitting unit resumes regardless of the output of the sensor unit.

4. The LED module of claim 1, wherein
the voltage supply circuit includes:
a first diode connected in a forward direction of the first diode between a high-potential end of the group of the LEDs and the control circuit; and
a second diode connected in a forward direction of the second diode between the internal power source and the control circuit.

5. The LED module of claim 1, wherein
the sensor unit serves as a brightness sensor that detects brightness in the lighting space.

6. An illumination device comprising:
the LED module of claim 1; and
a lighting device that supplies power to the LED module.

7. An illumination device comprising:
an LED module including a light-emitting unit including a plurality of LEDs connected in series to one another, a sensor unit serving as at least one of a motion sensor and a brightness sensor that detects brightness in a lighting space, a control circuit that outputs a control voltage for controlling power supplied to the light-emitting unit according to output of the sensor unit, and an output unit that outputs the control voltage from the control circuit to outside; and
a lighting device including a first power source, a power interrupt circuit inserted in a power supply path through which the light-emitting unit is supplied with power from the first power source, and a power supply control circuit that controls the power interrupt circuit to adjust an amount of power to be output to the light-emitting unit based on the control voltage from the output unit, wherein the LED module further includes:
a second power source; and
a voltage supply circuit that
supplies the control circuit with voltage equivalent to voltage drop between the ends of a group of LEDs included in the plurality of LEDs while the first power source is supplying the power to the light-emitting unit, and
supplies the control circuit with voltage output from the second power source while the power interrupt circuit is interrupting the power from the first power source to the light-emitting unit.

\* \* \* \* \*